United States Patent
Lee et al.

(10) Patent No.: US 10,673,667 B2
(45) Date of Patent: *Jun. 2, 2020

(54) METHOD OF TRANSMITTING REFERENCE SIGNAL AND TRANSMITTER USING THE SAME

(71) Applicant: LG ELECTRONICS INC., Seoul (KR)

(72) Inventors: Jung Hoon Lee, Anyang-si (KR); Dae Won Lee, Anyang-si (KR); Ki Jun Kim, Anyang-si (KR); Joon Kui Ahn, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/023,910

(22) Filed: Jun. 29, 2018

(65) Prior Publication Data

US 2018/0324019 A1 Nov. 8, 2018

Related U.S. Application Data

(63) Continuation of application No. 14/960,111, filed on Dec. 4, 2015, now Pat. No. 10,044,542, which is a (Continued)

(30) Foreign Application Priority Data

Mar. 13, 2009 (KR) .......... 10-2009-0021828

(51) Int. Cl.
*H04L 5/00* (2006.01)
*H04L 27/26* (2006.01)
*H04L 25/02* (2006.01)

(52) U.S. Cl.
CPC ........ *H04L 27/2613* (2013.01); *H04L 5/0007* (2013.01); *H04L 5/0048* (2013.01);
(Continued)

(58) Field of Classification Search
CPC ....... H04B 1/04; H04L 5/0007; H04L 5/0048; H04L 23/02; H04L 25/02; H04L 25/0202;
(Continued)

(56) References Cited

U.S. PATENT DOCUMENTS 7,062,002 B1 6/2006 Michel et al.
7,558,293 B2 7/2009 Choi et al.
(Continued)

FOREIGN PATENT DOCUMENTS

JP 2003-317236 A 11/2003
JP 2004-29984 A 1/2004
(Continued)

OTHER PUBLICATIONS

Intel Corporation, [NRAH2-05] Email discussion on DMRS Sequence for NR PBCH, 3GPP TSG RAN WG1 #90 Meeting, 9 pages, Aug. 2017.*
(Continued)

*Primary Examiner* — Frank Duong
(74) *Attorney, Agent, or Firm* — Birch, Stewart, Kolasch & Birch, LLP

(57) ABSTRACT

A method and device for generating a reference signal sequence are discussed. The method includes generating the reference signal sequence, and transmitting the reference signal sequence, wherein the reference signal sequence is defined by a specific equation based on a pseudo-random sequence.

10 Claims, 19 Drawing Sheets

Related U.S. Application Data continuation of application No. 13/925,474, filed on Jun. 24, 2013, now Pat. No. 9,225,572, which is a continuation of application No. 13/241,064, filed on Sep. 22, 2011, now Pat. No. 8,493,837, which is a continuation of application No. 12/762,103, filed on Apr. 16, 2010, now Pat. No. 8,050,220, which is a continuation of application No. 12/405,686, filed on Mar. 17, 2009, now Pat. No. 7,729,237.

(60) Provisional application No. 61/049,777, filed on May 2, 2008, provisional application No. 61/048,227, filed on Apr. 28, 2008, provisional application No. 61/036,998, filed on Mar. 17, 2008.

(52) U.S. Cl.
CPC ........ *H04L 5/0053* (2013.01); *H04L 25/0226* (2013.01); *H04L 27/262* (2013.01); *Y02D 70/12* (2018.01); *Y02D 70/126* (2018.01)

(58) Field of Classification Search
CPC . H04L 25/0226; H04L 27/26; H04L 27/2607; H04L 27/2613; H04L 27/262; H04L 27/2649
See application file for complete search history.

(56) References Cited

U.S. PATENT DOCUMENTS

| | | | |
|---|---|---|---|
| 7,761,347 B2 | 7/2010 | Fujisawa et al. | |
| 8,145,121 B2 | 3/2012 | Kim et al. | |
| 8,249,632 B2 | 8/2012 | Kim et al. | |
| 8,289,946 B2* | 10/2012 | Luo | H04L 5/0007 370/208 |
| 8,493,837 B2 | 7/2013 | Lee et al. | |
| 8,649,401 B2* | 2/2014 | Luo | H04J 11/0076 370/350 |
| 8,755,453 B2* | 6/2014 | Varadarajan | H04L 23/02 375/295 |
| 2006/0045003 A1 | 3/2006 | Choi et al. | |
| 2008/0107086 A1 | 5/2008 | Fukuta et al. | |
| 2008/0273522 A1 | 11/2008 | Luo et al. | |
| 2009/0080569 A1 | 3/2009 | Han et al. | |
| 2009/0135803 A1 | 5/2009 | Luo et al. | |
| 2009/0136034 A1 | 5/2009 | Gaal et al. | |
| 2009/0257523 A1 | 10/2009 | Varadarajan et al. | |
| 2009/0268910 A1 | 10/2009 | Liu et al. | |
| 2010/0062783 A1 | 3/2010 | Luo et al. | |

FOREIGN PATENT DOCUMENTS

| | | |
|---|---|---|
| KR | 2006-0023863 A | 3/2006 |
| KR | 10-0856249 A | 8/2008 |
| KR | 10-2008-0095731 A | 10/2008 |
| KR | 10-2008-0110453 A | 12/2008 |
| WO | WO 2007/127902 A2 | 11/2007 |
| WO | WO 2009/023792 A1 | 2/2009 |

OTHER PUBLICATIONS

Motorola, Text proposal on pseudo-random sequence generation of downlink cell-specific reference signals, 3GPP TSG RAN WG1 Meeting #49, 3 pages, May 2007.*

3GPP TS 36.211, V8.1.0, 3rd Generation Partnership Project; Technical Specification Group Radio Access Network; Evolved Universal Terrestrial Radio Access (E-UTRA); Physical Channels and Modulation (Release 8), Nov. 2007, 54 pages.

Ericsson, "Update of uplink reference-signal hopping, downlink reference signals, scrambling sequences, DwPTS/UpPTS lengths for TDD and control channel processing," 3GPP TSG-RAN WG1 Meeting #52, Change Request, Feb. 11-15, 2008, R1-081161, 61 pages.

IST-4-027756 WINNER II, WINNER II System Concept Description, D6.13.14 version 1.1, 172 pages, Jan. 2008.

LG Electronics et al., "Fast forwarding Gold sequence for random number sequence generation," 3GPP TSG RAN WG1 #52bis, Mar. 31-Apr. 4, 2008, R1-081620, 2 pages.

LG Electronics, "PRS sequence generation for downlink reference signal," 3GPP TSG RAN WG1 #52bis, Mar. 31-Apr. 4, 2008, R1-081248, pp. 1-6.

Nokia Siemens Networks et al., "Way Forward on Scrambling Sequence Initialisation," 3GPP TSG-RAN Working Group 1 #52, Tdoc R1-081106, Sorrento, Italy, Feb. 11-15, 2008, 2 pages total.

QUALCOMM Europe, "Hopping of UL DM-RS and Other Details," 3GPP TSG RAN1 #51bis, Jan. 14-18, 2008, Sevilla, Spain, R1-080468, pp. 1-7.

Samsung, "On Gold Sequence Initialization", 3GPP TSG RAN WG1 Meeting #52bis, R1-081229, Shenzhen, China, Mar. 31-Apr. 4, 2008, 5 pages.

Aronsson et al., IST-4-027756 WINNER II D2.3.3—v1.00Link level procedures for the WINNER System, Information Society Technologies, 211 pages, Nov. 2007.

R1-062275, Comparison of Zadoff-Chu and Zero Correlation Zone Codes for E-UTRA RACH, Ericsson, 7 pages, Sep. 2006.

R1-072811, Design of S-SCH sequences, ETRI, 5 pages, Jun. 2007.

* cited by examiner

METHOD OF TRANSMITTING REFERENCE SIGNAL AND TRANSMITTER USING THE SAME

CROSS-REFERENCE TO RELATED APPLICATIONS

This Application is a Continuation of U.S. patent application Ser. No. 14/960,111 filed on Dec. 4, 2015 (now U.S. Pat. No. 10,044,542 issued on Aug. 7, 2018), which is a Continuation of U.S. patent application Ser. No. 13/925,474 filed on Jun. 24, 2013 (now U.S. Pat. No. 9,225,572 issued on Dec. 29, 2015), which is a Continuation of U.S. patent application Ser. No. 13/241,064 filed on Sep. 22, 2011 (now U.S. Pat. No. 8,493,837 issued on Jul. 23, 2013), which is a Continuation of U.S. patent application Ser. No. 12/762,103 filed on Apr. 16, 2010 (now U.S. Pat. No. 8,050,220 issued on Nov. 1, 2011), which is a Continuation of U.S. patent application Ser. No. 12/405,686 filed on Mar. 17, 2009 (now U.S. Pat. No. 7,729,237 issued on Jun. 1, 2010), which claims the priority benefit under 35 U.S.C. § 119(e) to U.S. Provisional Application Nos. 61/049,777 filed on May 2, 2008, 61/048,227 filed on Apr. 28, 2008 and 61/036,998 filed on Mar. 17, 2008, and under 35 U.S.C. § 119(a) to Korean Patent Application No. 10-2009-0021828 filed in the Republic of Korea on Mar. 13, 2009, all of which are hereby expressly incorporated by reference into the present application. Further, U.S. patent application Ser. No. 12/762,027 filed on Apr. 16, 2010 (now U.S. Pat. No. 7,940,643 issued on May 10, 2011) is a Continuation of U.S. patent application Ser. No. 12/405,686.

BACKGROUND OF THE INVENTION

Field of the Invention

The present invention relates to wireless communications, and more particularly, to generation and application of a sequence for a reference signal in a wireless communication system.

Discussion of the Related Art

Wireless communication systems are widely spread all over the world to provide various types of communication services such as voice or data. In general, the wireless communication system is a multiple access system capable of supporting communication with multiple users by sharing available system resources (e.g., bandwidth, transmit power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

In the wireless communication system, a sequence is generally used in various usages such as a reference signal, a scrambling code, etc. The sequence used in the wireless communication system generally satisfies the following properties.

(1) A good correlation property for providing high detection performance.

(2) A low peak-to-average power ratio (PAPR) for increasing efficiency of a power amplifier.

(3) Generation of a large number of sequences to transmit a large amount of information or to facilitate cell planning.

Although a constant amplitude and zero auto correlation (CAZAC) sequence having a good PAPR property has been proposed, the number of available sequences is limited. Therefore, many wireless communication systems use a sequence generated in a pseudo-random manner. A pseudo-random sequence has an advantage in that a large number of sequences are available, but has a problem of a high PAPR in a specific pattern.

Various binary or non-binary pseudo-random sequences have been used in the wireless communication system. The pseudo-random sequences can be easily generated using an m-stage linear feedback shift register (LFSR), and have a significantly excellent random property. An m-sequence is used as a scrambling code in a wideband CDMA (WCDMA) system since a structure of the m-sequence is simpler than the non-binary pseudo-random sequence.

A gold sequence is a pseudo-random sequence generated by using two different binary m-sequences. The gold sequence can be easily implemented by two m-stage LFSRs. The gold sequence has an advantage in that different pseudo-random sequences can be generated in accordance with a period while varying an initial state of each m-stage LFSR.

Accordingly, there is a need for a method capable of generating a sequence with improved PAPR and correlation properties.

SUMMARY OF THE INVENTION

The present invention provides a method and apparatus for transmitting a reference signal in a wireless communication system. In addition, a receiver for receiving the transmitted reference signal is also provided.

The present invention also provides a method and apparatus for transmitting a sequence in a wireless communication system. In addition, a receiver for receiving the transmitted sequence is also provided.

In an aspect, a method of transmitting a reference signal in a wireless communication system is provided. The method includes generating a reference signal sequence, mapping a portion or entirety of the reference signal sequence to at least one RB, and transmitting a reference signal in the at least one RB. The reference signal sequence is defined by $$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1$$

where $n_s$ is a slot number within a radio frame, l is an orthogonal frequency division multiplexing (OFDM) symbol number within a slot and $N_{RB}^{max,DL}$ is a maximum number of resource blocks (RBs). A pseudo-random sequence c(i) is generated by a gold sequence generator which is initialized with initial values obtained by using $(2N_{ID}^{cell}+1)$, where $N_{ID}^{cell}$ is a cell identifier.

The pseudo-random sequence c(i) may be defined by $c(i)=(x(i+Nc)+y(i+Nc))$mod 2

$x(i+31)=(x(i+3)+x(i))$mod 2

$y(i+31)=(y(i+3)+y(i+2)+y(i+1)+y(i))$mod 2 where x(i) and y(i) are m-sequences and Nc is a constant. The m-sequence x(i) may be initialized with x(0)=1, x(i)=0, i=1, 2, . . . , 30, and the m-sequence (y) may be initialized with the initial values. The Nc may be a value in range from 1500 to 1800.

The initial values may vary as the OFDM symbol number varies. The initial values may be obtained by using 1 $(2N_{ID}^{cell}+1)$. The size of the initial values may be 31 bits.

One RB may comprise 12 subcarriers in frequency domain. Two modulation symbols of the reference signal sequence may be mapped to two subcarriers in one RB.

The reference signal may be a cell common reference signal or a user equipment (UE) specific reference signal.

In another aspect, a transmitter includes a reference signal generator to generate a reference signal, and a transmit circuitry to transmit the reference signal. The reference signal generator generates the reference signal by generating a reference signal sequence which is defined by $$r_{l,n_s}(m) = \frac{1}{\sqrt{2}}(1-2\cdot c(2m)) + j\frac{1}{\sqrt{2}}(1-2\cdot c(2m+1)),$$
$$m = 0, 1, \ldots, 2N_{RB}^{max,DL}-1$$

where $n_s$ is a slot number within a radio frame, l is an OFDM symbol number within a slot and $N_{RB}^{max,DL}$ is a maximum number of RBs. A pseudo-random sequence c(i) is generated by a gold sequence generator which is initialized with initial values obtained by using $(2N_{ID}^{cell}+1)$, where $N_{ID}^{cell}$ is a cell identifier. The reference signal generator maps a portion or entirety of the reference signal sequence to at least one RB.

In still another aspect, a receiver includes a receive circuitry to receive a reference signal and a receive signal, a channel estimator to estimate a channel by using the reference signal, and a data processor to process the receive signal by using the channel. The reference signal is generated based on a reference signal sequence which is defined by $$r_{l,n_s}(m) = \frac{1}{\sqrt{2}}(1-2\cdot c(2m)) + j\frac{1}{\sqrt{2}}(1-2\cdot c(2m+1)),$$
$$m = 0, 1, \ldots, 2N_{RB}^{max,DL}-1$$

where $n_s$ is a slot number within a radio frame, l is an OFDM symbol number within a slot and $N_{RB}^{max,DL}$ is a maximum number of RBs. A pseudo-random sequence c(i) is generated by a gold sequence generator which is initialized with initial values obtained by using $(2N_{ID}^{cell}+1)$, where $N_{ID}^{cell}$ is a cell identifier.

A proposed sequence provides low peak-to-average power ratio (PAPR) and high cross-correlation properties. Therefore, transmit power can be effectively provided in a transmitter, and signal detection performance can be improved in a receiver. The proposed sequence can be used for a reference signal requiring high reliability and also can be used for other scrambling codes.

DETAILED DESCRIPTION OF THE EMBODIMENTS

The technique described below can be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as Universal Terrestrial Radio Access (UTRA) or CDMA2000. The TDMA may be implemented with a radio technology such as Global System for Mobile communications (GSM)/General Packet Radio Service (GPRS)/Enhanced Data Rates for GSM Evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink and employs the SC-FDMA in uplink. LTE-advance (LTE-A) is an evolution of the 3GPP LTE.

For clarity, the following description will focus on the 3GPP LTE/LTE-A. However, technical features of the present invention are not limited thereto.

Figure 1:
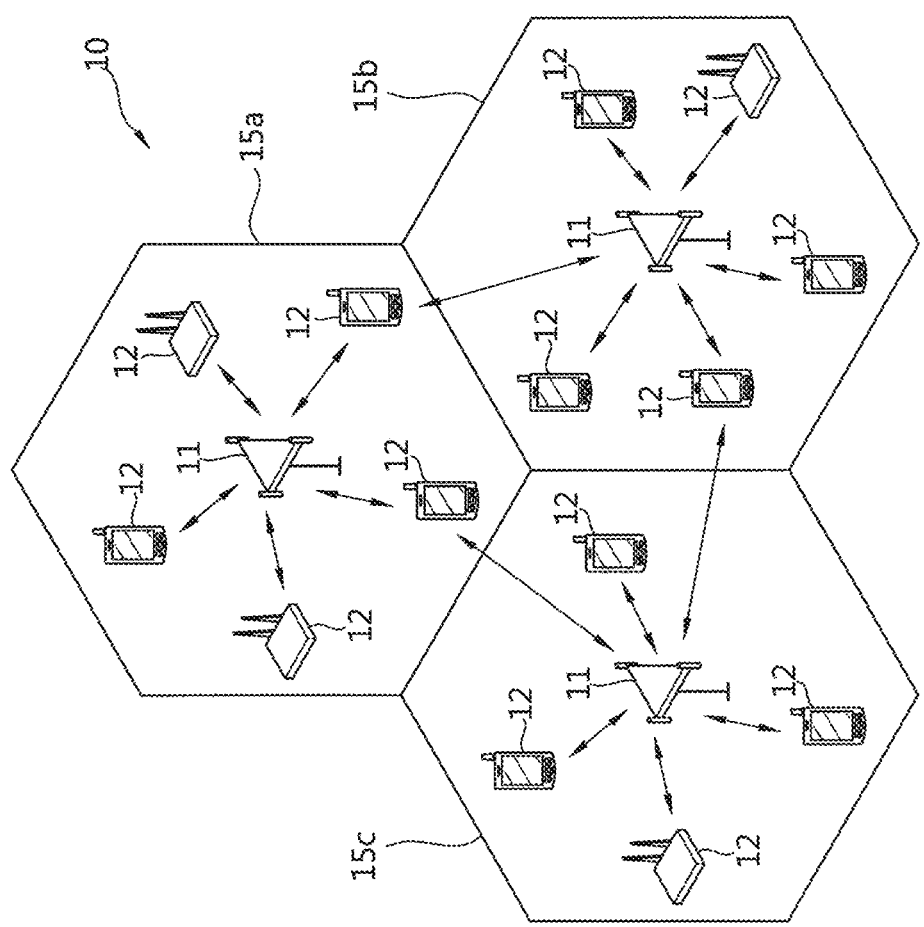
FIG. 1 shows a wireless communication system.

FIG. 1 shows a wireless communication system.

Referring to FIG. 1, a wireless communication system 10 includes at least one base station (BS) 11. The BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, a downlink is a communication link from the BS to the UE, and an uplink is a communication link from the UE to the BS. In the downlink, a transmitter may be a part of the BS, and a receiver may be a part of the UE. In the uplink, the transmitter may be a part of the UE, and the receiver may be a part of the BS.

Figure 2:
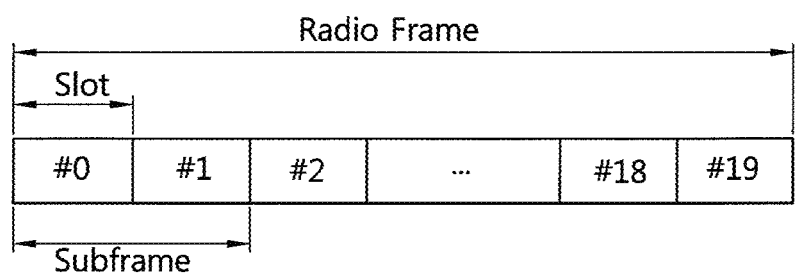
FIG. 2 shows a structure of a radio frame in the 3GPP LTE.

FIG. 2 shows a structure of a radio frame in the 3GPP LTE.

Referring to FIG. 2, the radio frame includes 10 subframes. One subframe includes two slots. A time for transmitting one subframe is defined as a transmission time interval (TTI). For example, one subframe may have a length of 1 millisecond (ms), and one slot may have a length of 0.5 ms.

One slot includes a plurality of orthogonal frequency division multiplexing (OFDM) symbols in a time domain. Since the 3GPP LTE uses the OFDMA in the downlink, the OFDM symbol is for representing one symbol period. According to a system, the OFDM symbol can also be referred to as an SC-FDMA symbol or a symbol period. A resource block (RB) is a resource allocation unit, and includes a plurality of contiguous subcarriers in one slot.

The structure of the radio frame is shown for exemplary purposes only. Thus, the number of subframes included in the radio frame or the number of slots included in the subframe or the number of OFDM symbols included in the slot may be modified in various manners.

Figure 3:
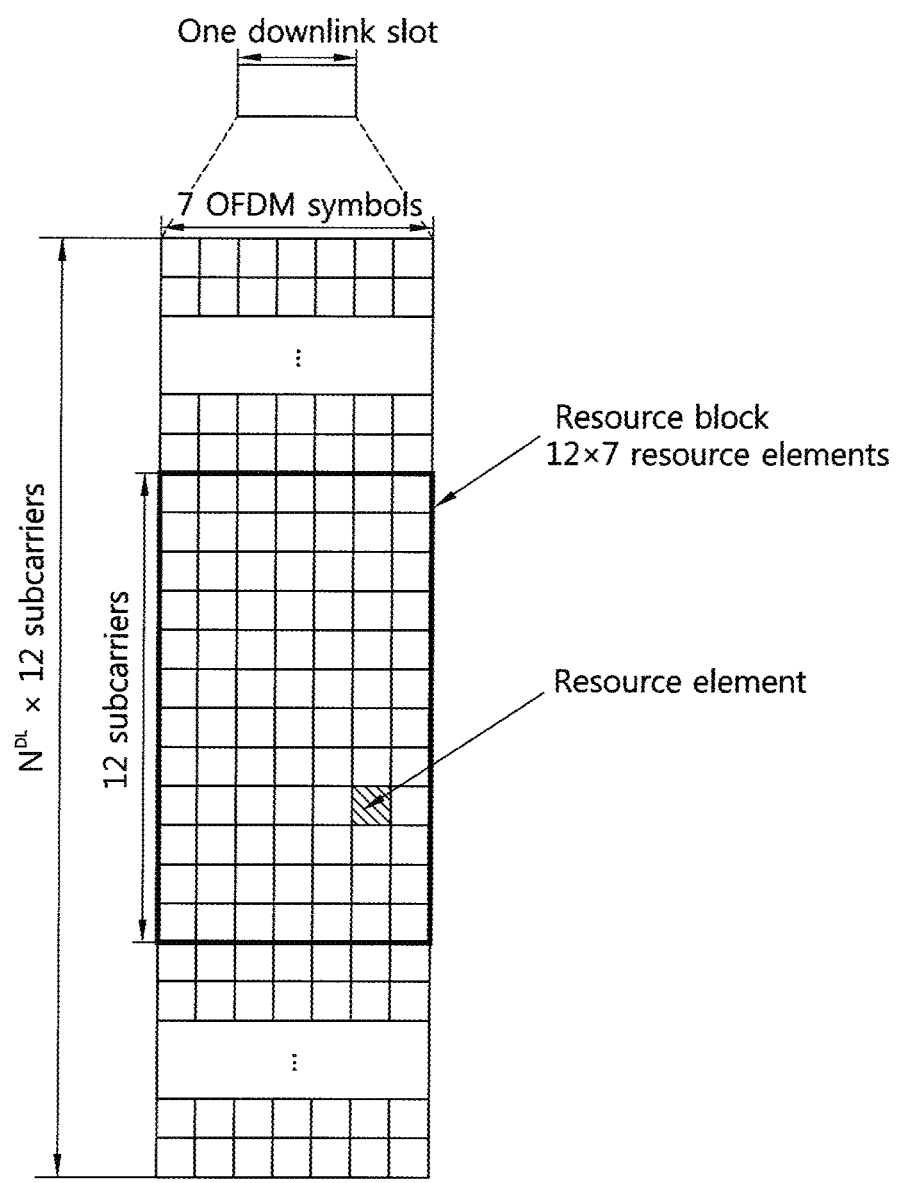
FIG. 3 shows an example of a resource grid for one downlink slot.

FIG. 3 shows an example of a resource grid for one downlink slot.

Referring to FIG. 3, the downlink slot includes a plurality of OFDM symbols in a time domain. It is described herein that one downlink slot includes 7 OFDM symbols, and one resource block (RB) includes 12 subcarriers in a frequency domain as an example. However, the present invention is not limited thereto.

Each element on the resource grid is referred to as a resource element. One RB includes 12×7 resource elements. The number $N^{DL}$ of RBs included in the downlink slot depends on a downlink transmit bandwidth.

Figure 4:
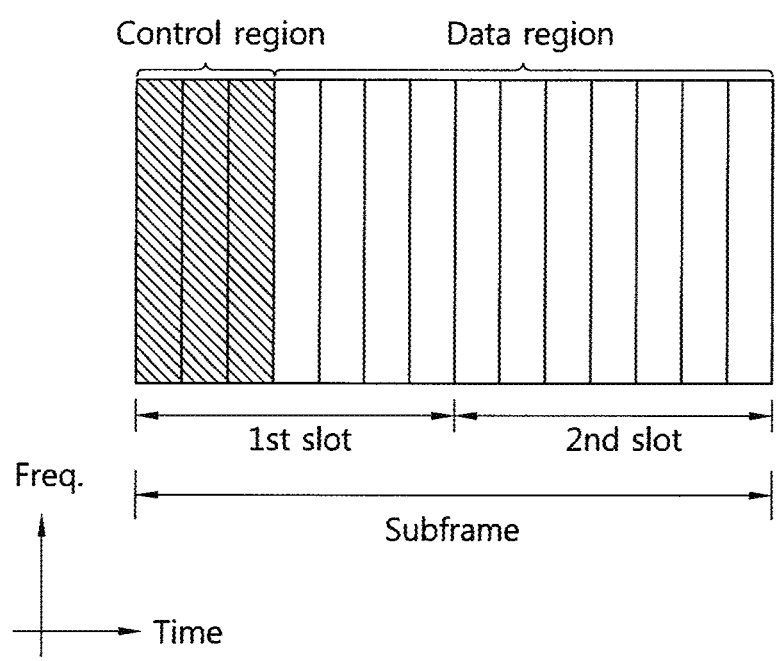
FIG. 4 shows an exemplary structure of a downlink subframe.

FIG. 4 shows an exemplary structure of a downlink subframe.

Referring to FIG. 4, the subframe includes two slots. A maximum of three OFDM symbols located in a front portion of a $1^{st}$ slot within the subframe correspond to a control region to be assigned with control channels. The remaining OFDM symbols correspond to a data region to be assigned with a physical downlink shared chancel (PDSCH).

Examples of downlink control channels used in the 3GPP LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. Control information transmitted through the PDCCH is referred to as downlink control information (DCI). The DCI includes uplink or downlink scheduling information or includes an uplink transmit power control command for arbitrary UE groups.

Now, a reference signal will be described.

When data is transmitted in a wireless communication system, the transmitted data may be distorted on a radio channel. In order for a receiver to restore the distorted data into original data, a channel state needs to be known so that distortion of a received signal is compensated for according to the channel state. To know the channel state, a signal known in advance to both a transmitter and the receiver is used. Such a signal is referred to as a reference signal or a pilot. Since the reference signal is an important signal to know the channel state, the transmitter transmits the reference signal with greater transmit power than other signals. In addition, to distinguish the reference signal transmitted between cells in a multi-cell environment, the reference signal has to have good peak-to-average power ratio (PAPR) and correlation properties.

The reference signal can be classified into a cell common reference signal and a UE specific reference signal. The cell common reference signal is a reference signal used by all UEs within a cell. The UE specific reference signal is a reference signal used by a UE within the cell or used by a UE group.

Figure 5:
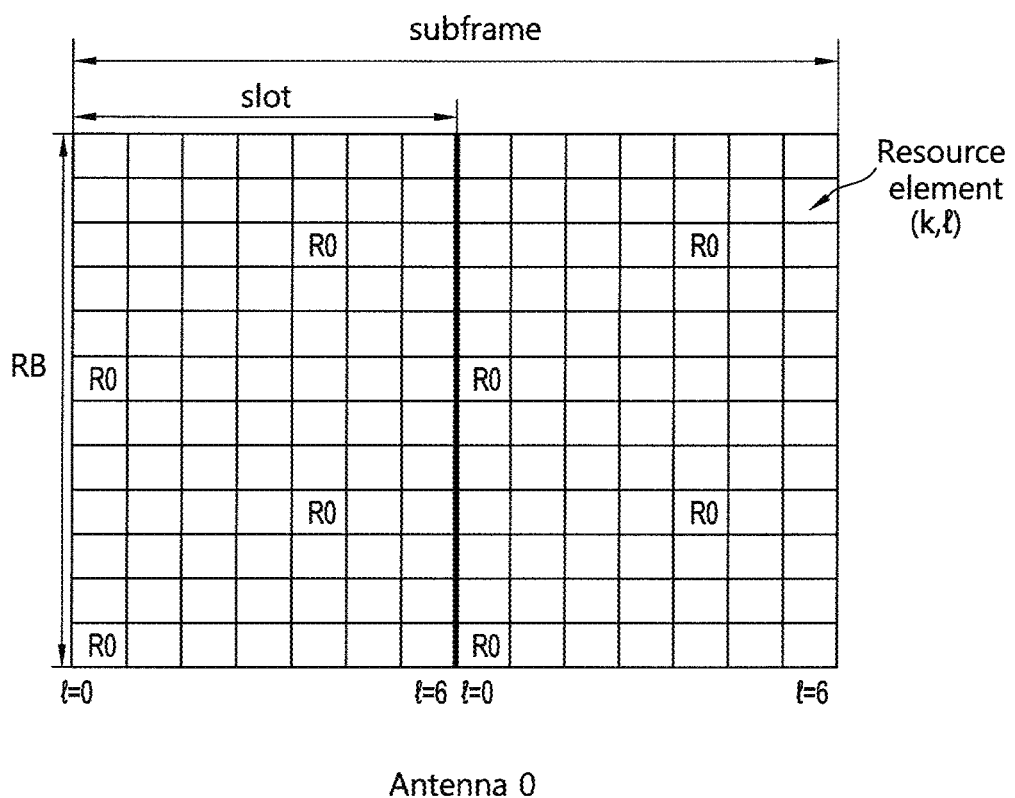
FIG. 5 shows an exemplary structure of a downlink common reference signal when a BS uses one antenna.
Figure 6:
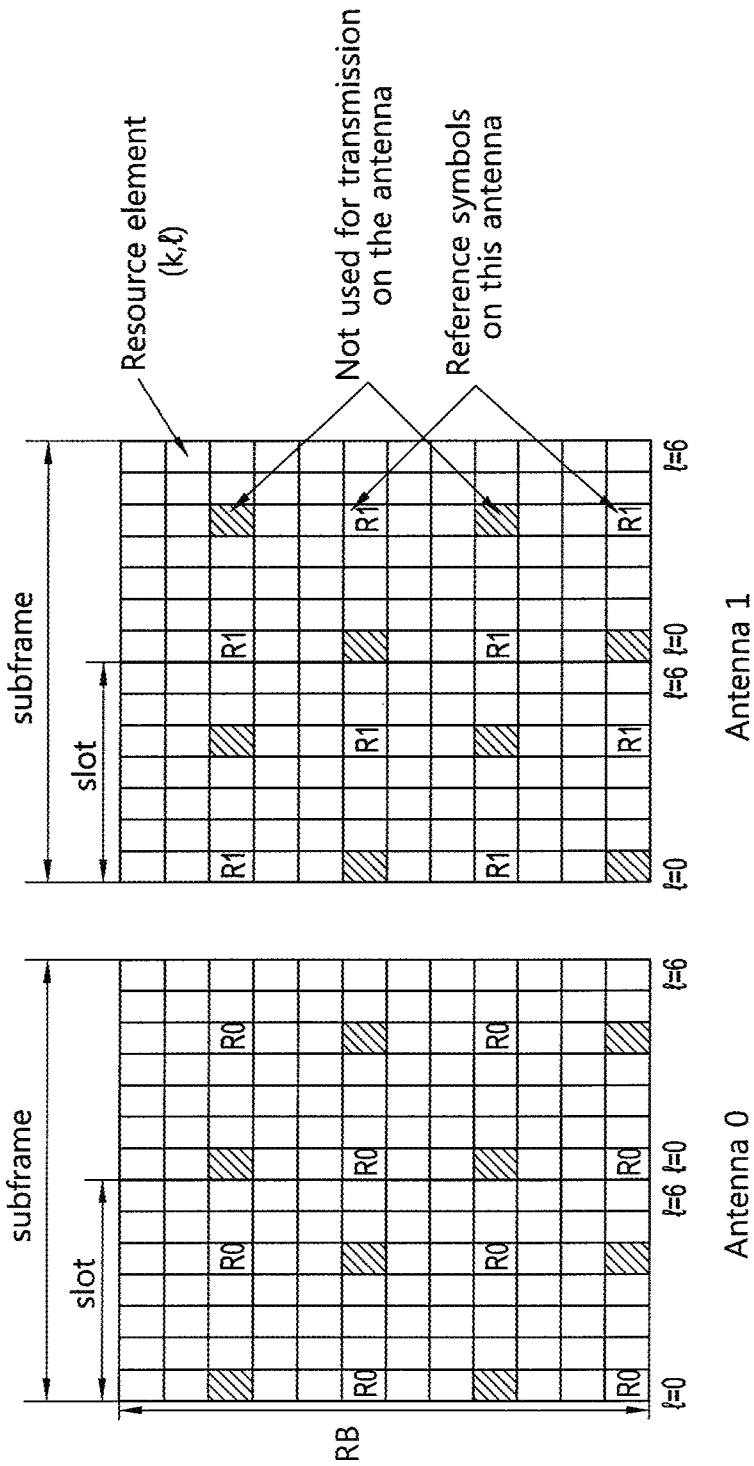
FIG. 6 shows an exemplary structure of a downlink common reference signal when a BS uses two antennas.
Figure 7:
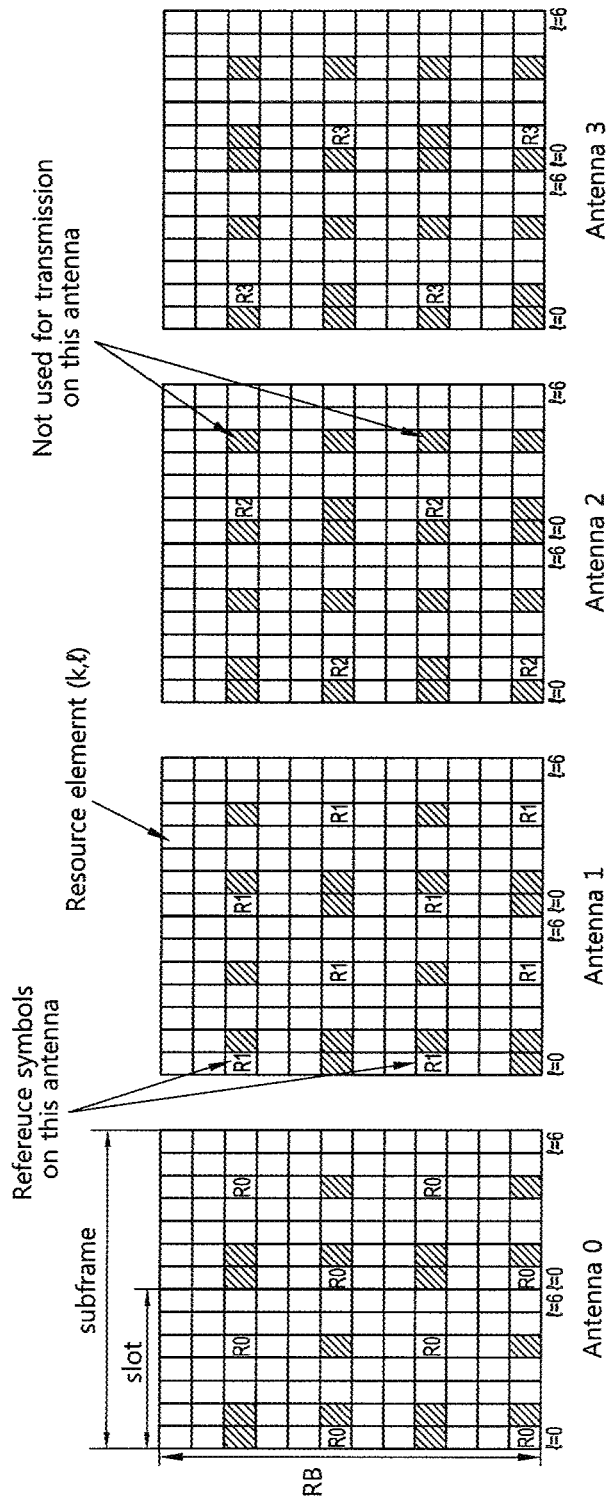
FIG. 7 shows an exemplary structure of a downlink common reference signal when a BS uses four antennas.

FIG. 5 shows an exemplary structure of a downlink common reference signal when a BS uses one antenna. FIG. 6 shows an exemplary structure of a downlink common reference signal when a BS uses two antennas. FIG. 7 shows an exemplary structure of a downlink common reference signal when a BS uses four antennas. This may be found in section 6.10.1 of 3GPP TS 36.211 V8.0.0 (2007-09) "Evolved Universal Terrestrial Radio Access (E-UTRA); Physical channels and modulation (Release 8)". Rp denotes a reference signal for a p-th antenna (herein, $p \in \{0, 1, 2, 3\}$). R0 to R3 do not overlap with one another. In one OFDM symbol, each Rp is positioned with a spacing of 6 subcarriers. Therefore, if one RB includes 12 subcarriers, a sequence having a length of 2 sequences (or two modulation symbols) is required for one RB. Within a subframe, the number of R0s is equal to the number of R1s, and the number of R2s is equal to the number of R3s. Within the subframe, the number of R2s and R3s is less than the number of R0s and R1s. Rp is not used in transmission through antennas except for the $p^{th}$ antenna. This is to avoid interference between antennas.

Now, generation of a sequence for a reference signal will be described.

A reference signal generated by using a gold sequence generator is considered. A gold sequence can be implemented with two 31-stage linear feedback shift registers (LFSRs). It is assumed that a first LFSR 'x(30)x(29)x(28) . . . x(2)x(1)x(0)' of the two LFSRs is initialized with '0000000000000000000000000000001'. In addition, initial values of a second LFSR are determined by a cell identifier (ID), a subframe number, and an OFDM symbol number. The cell ID denotes a cell specific ID. The subframe number denotes an index of a subframe within a radio frame. The OFDM symbol number denotes an index of an OFDM symbol within a subframe (or slot).

Figure 8:
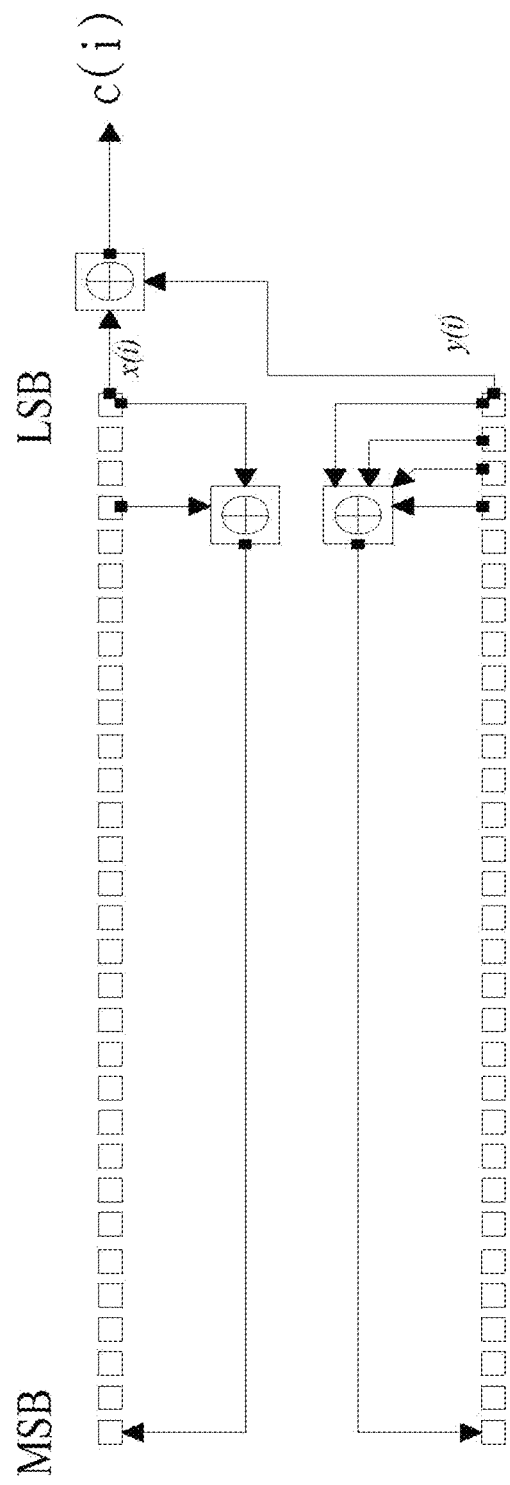
FIG. 8 shows an example of a gold sequence generator.

FIG. 8 shows an example of a gold sequence generator. A sequence generation polynomial $D^{31}+D^3+1$ is used for a first m-sequence x(i), and a sequence generation polynomial $D^{31}+D^3+D^2+D+1$ is used for a second m-sequence y(i). These two m-sequences are used to generate a pseudo-random sequence c(i). The pseudo-random sequence c(i) is generated by a generation polynomial of Equation 1 as shown:

$$c(i)=(x(i)+y(i)) \bmod 2$$

$$x(i+31)=(x(i+3)+x(i)) \bmod 2$$

$$y(i+31)=(y(i+3)+y(i+2)+y(i+1)+y(i)) \bmod 2 \quad \text{[Equation 1]}$$

where i=0, 1, . . . , $M_{max}$−1, and $M_{max}$ is a length of a binary pseudo-random sequence generated using a gold sequence. In the pseudo-random sequence having a length of Mmax, only a portion of the sequence may be used. If M is a length of a sequence using only a portion of the pseudo-random sequence having a length of $M_{max}$, then M≤$M_{max}$. M may vary depending on the number of RBs used for data transmission. The number of available RBs varies according to an available frequency band in a 3GPP LTE system, and thus the value M may also vary according to the number of allocated RBs.

In case of the first LFSR, the initial values are fixed to '0000000000000000000000000000001' as described above. The initial values of the second LFSR are determined by the cell ID, the subframe number, and the OFDM symbol number.

Figure 9:
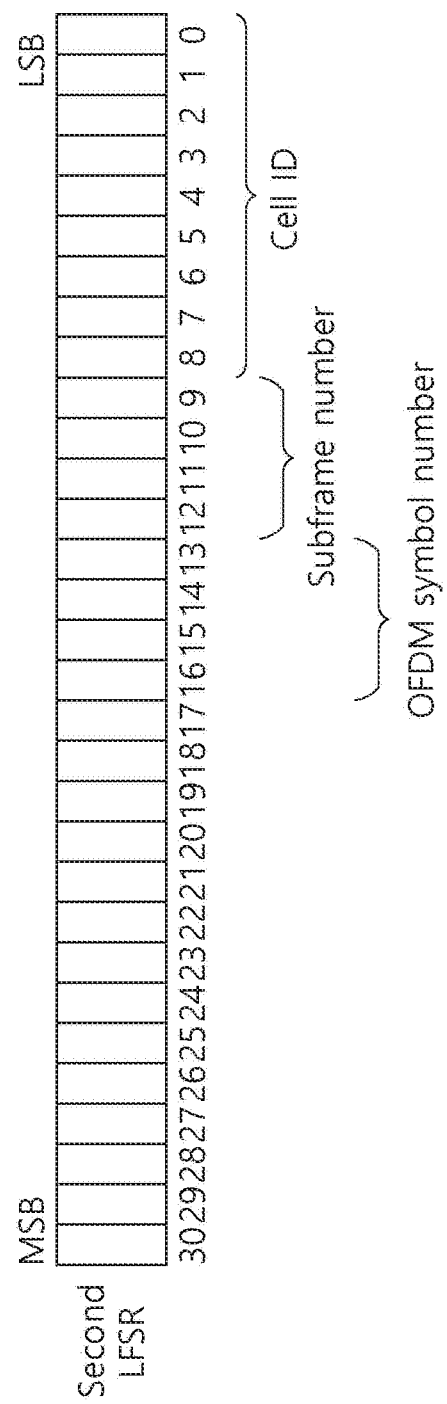
FIG. 9 shows setting of the initial values of the second LFSR.

FIG. 9 shows setting of the initial values of the second LFSR. Among the 31 bits of the initial values, 17 bits from a least significant bit (LSB) are initialized with a 9-bit cell ID, a 4-bit subframe number, and a 4-bit OFDM symbol number. The 3GPP LTE supports 504 unique cell IDs, and thus the cell ID ranges from 0 to 503. One radio frame includes 10 subframes, and thus the subframe number ranges from 0 to 9. One subframe can include up to 14 OFDM symbols, and thus the OFDM symbol number ranges from 0 to 13. The remaining 14 bits from a most significant bit (MSB) are initialized with '0'. The initial values of the second LFSR can be expressed by the following table.

TABLE 1

| x(30) x(29) x(28) x(27) x(26) . . . x(3)x(2)x(1)x(0) | | | |
|---|---|---|---|
| Set to zero | OFDM symbol number | Subframe Number | Cell ID |
| 14 bit | 4 bit | 4 bit | 9 bit |

In the above table 1, a range and/or bit number for cell ID, OFDM symbol number and subframe number are exemplary purposed only and are not limited thereto. For example, the subframe number may be represented as a slot number. Since a radio frame includes 20 slots, the slot number may be in a range of 0~19.

After determining the initial values of the first LFSR and the initial values of the second LFSR, a portion or entirety of the pseudo-random sequence generated by the gold sequence generator is used as a reference signal. The generated sequence is modulated into a modulation symbol through quadrature phase shift keying (QPSK) modulation, and then is mapped to each resource element. In this case, only a portion of a pre-generated, specific-sized gold sequence can be used. For example, as shown in FIG. 5, among the 12 subcarriers constituting one RB, the reference signal can be mapped to two subcarriers with a spacing of 6 subcarriers.

However, when the pseudo-random sequence is generated as described above, '0' and '1' may not be included with a similar ratio in the generated binary pseudo-random sequence, and thus the number of '0's may be greater than the number of 1's or the number of '1's may be greater than the number of '0's. In this case, even if QPSK modulation is performed, a direct current (DC) component exists due to the biased pseudo-random sequence. As a result, the PAPR property may deteriorate through a process of inverse fast Fourier transform (IFFT). As a representative example, if the cell ID, the subframe number, and the OFDM symbol number are all '0', the 31 bits of the initial values of the second LFSR are all set to '0'.

Figure 10:
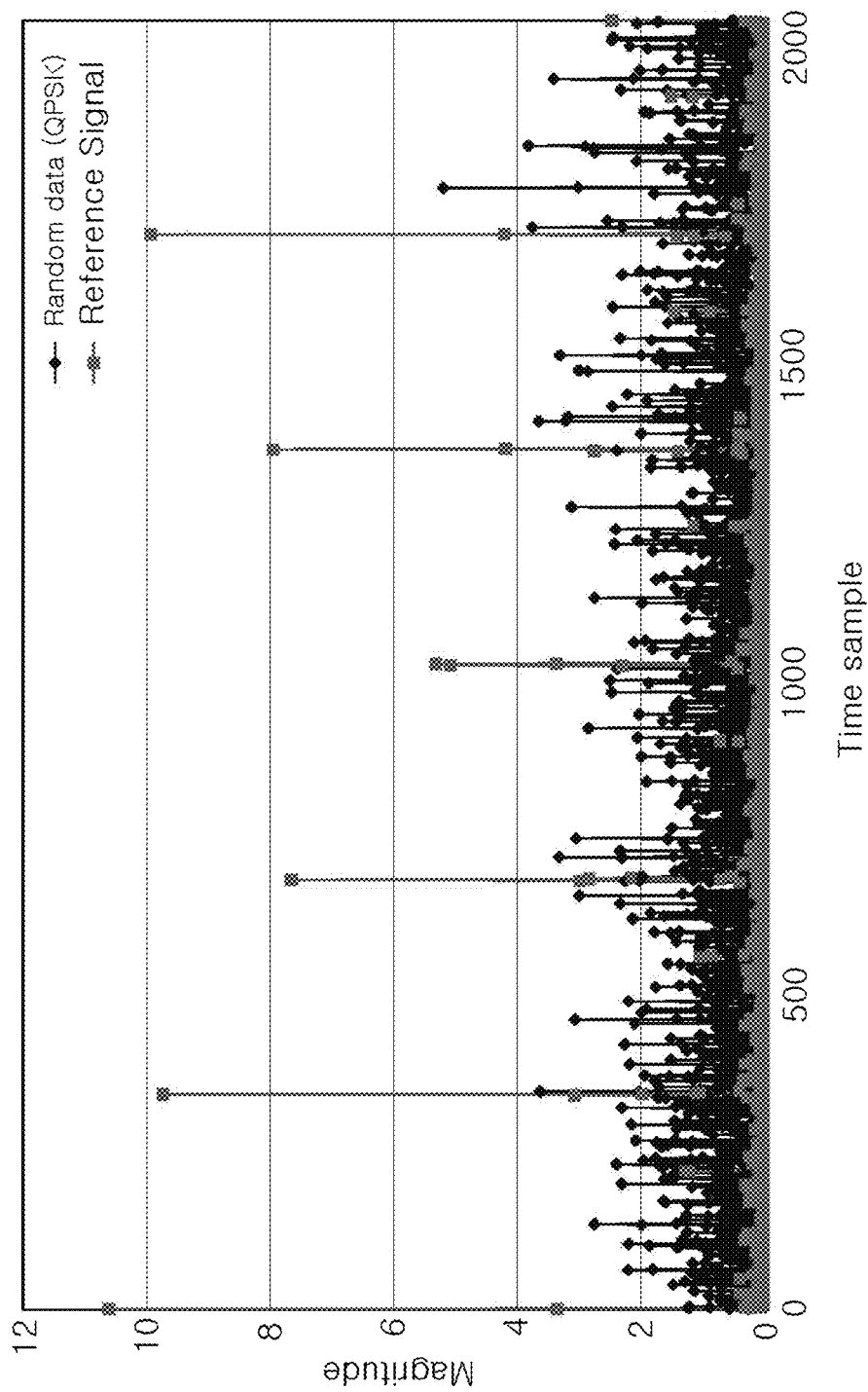
FIG. 10 is a graph for comparing sizes of a reference signal and any data when initial values of the second LFSR are all set to '0'.

FIG. 10 is a graph for comparing sizes of a reference signal and any data when initial values of the second LF SR are all set to '0'. When 31 bits of initial values of the gold sequence generator are all initialized with '0', a reference signal having a significantly large size than any other data is generated at some time samples, which implies degradation of the PAPR property.

Figure 11:
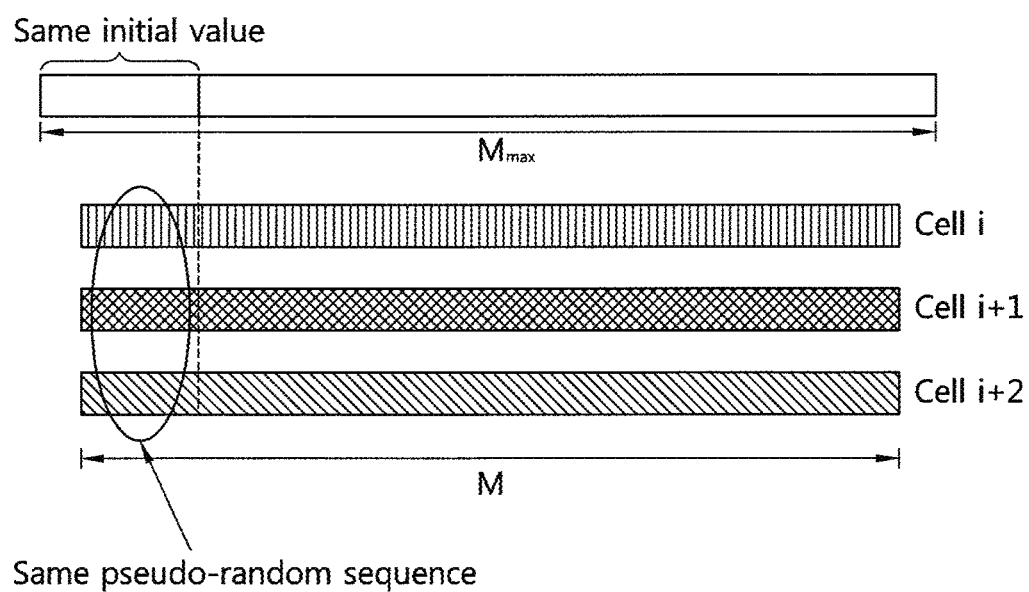
FIG. 11 shows a problem caused by initial values of a gold sequence in a multi-cell environment.

FIG. 11 shows a problem caused by initial values of a gold sequence in a multi-cell environment. In the multi-cell environment, each cell has a unique cell ID. However, since only 9 bits out of 31 bits of the initial values are different, a pseudo-random sequence may be generated to be almost identical for each cell if the remaining 22 bits are identical. In particular, if the cell ID is contiguous in each cell, up to 30 bits output the 31 bits of the initial values may overlap. Therefore, the correlation property may deteriorate when the generated pseudo-random sequence is used as a reference signal.

Hereinafter, generation of a sequence and application of the generated sequence for solving the aforementioned problem will be described.

First, a method of generating a sequence by changing a most significant bit (MSB) of initial values of a gold sequence will be described.

When a pseudo-random sequence is generated using the gold sequence, 14 bits from the MSB are changed to a suitable value to equalize a ratio of '0' and '1' included in the initial values of the second LFSR. Since a cell ID, a subframe number, and an OFDM symbol number may be all set to '0' in some cases, the remaining 14 bits are changed to a suitable value to define a gold sequence having a good PAPR property. In case of using the gold sequence, the generated pseudo-random sequence is determined according to the initial values. Thus, it is important to set the initial values to generate a sequence having a good PAPR.

In one embodiment, 14 bits from the MSB may be all set to '1'. By doing so, the initial values of the gold sequence can be prevented from being all set to '0'. Thus, deterioration of the PAPR property can be avoided. Table 2 shows a PAPR when the 14 bits from the MSB are all set to '0'. Table 3 shows a PAPR when the 14 bits from the MSB are all set to '1'. In Table 2 and Table 3, a peak value is shown with respect to the number of RBs (i.e., 6, 12, 25, 50, and 100) when a reference signal in use is a basic sequence generated by differently setting 17 bits from the LSB of the gold sequence generator according to a cell ID, a subframe number, and an OFDM symbol number.

TABLE 2

| # of RB | MSB | LSB | Peak value | PAPR |
|---|---|---|---|---|
| 6 | 00000000000000 | 10000110000100110 | 1.06 | 1.89 |
| 12 | 00000000000000 | 10000011010110011 | 1.33 | 2.36 |
| 25 | 00000000000000 | 00000000000000000 | 2.18 | 3.71 |
| 50 | 00000000000000 | 00000000000000000 | 5.16 | 8.81 |
| 100 | 00000000000000 | 00000000000000000 | 10.60 | 18.10 |

TABLE 3

| # of RB | MSB | LSB | Peak value | PAPR |
|---|---|---|---|---|
| 6 | 11111111111111 | 10110000011101000 | 0.93 | 1.66 |
| 12 | 11111111111111 | 10110101111110010 | 1.28 | 2.28 |
| 25 | 11111111111111 | 10110110110110110 | 1.53 | 2.61 |
| 50 | 11111111111111 | 10010100100100100 | 1.87 | 3.19 |
| 100 | 11111111111111 | 00000000000000010 | 2.49 | 4.25 |

As shown in Table 2 and Table 3, when the 14 bits from the MSB are all set to '0', the PAPR property is superior to a case where the 14 bits from the MSB are all set to '1'.

In another embodiment, the 14 bits from the MSB may be set to a bit sequence that can be cyclically mapped on a QPSK constellation. Sequence values initially output from the gold sequence generator are the same as the initial values. Thus, when the initial values are uniformly arranged on 4 symbol positions on the QPSK constellation, modulation symbols of the generated pseudo-random sequence can be prevented from being concentrated on a specific QPSK modulation symbol.

Figure 12:
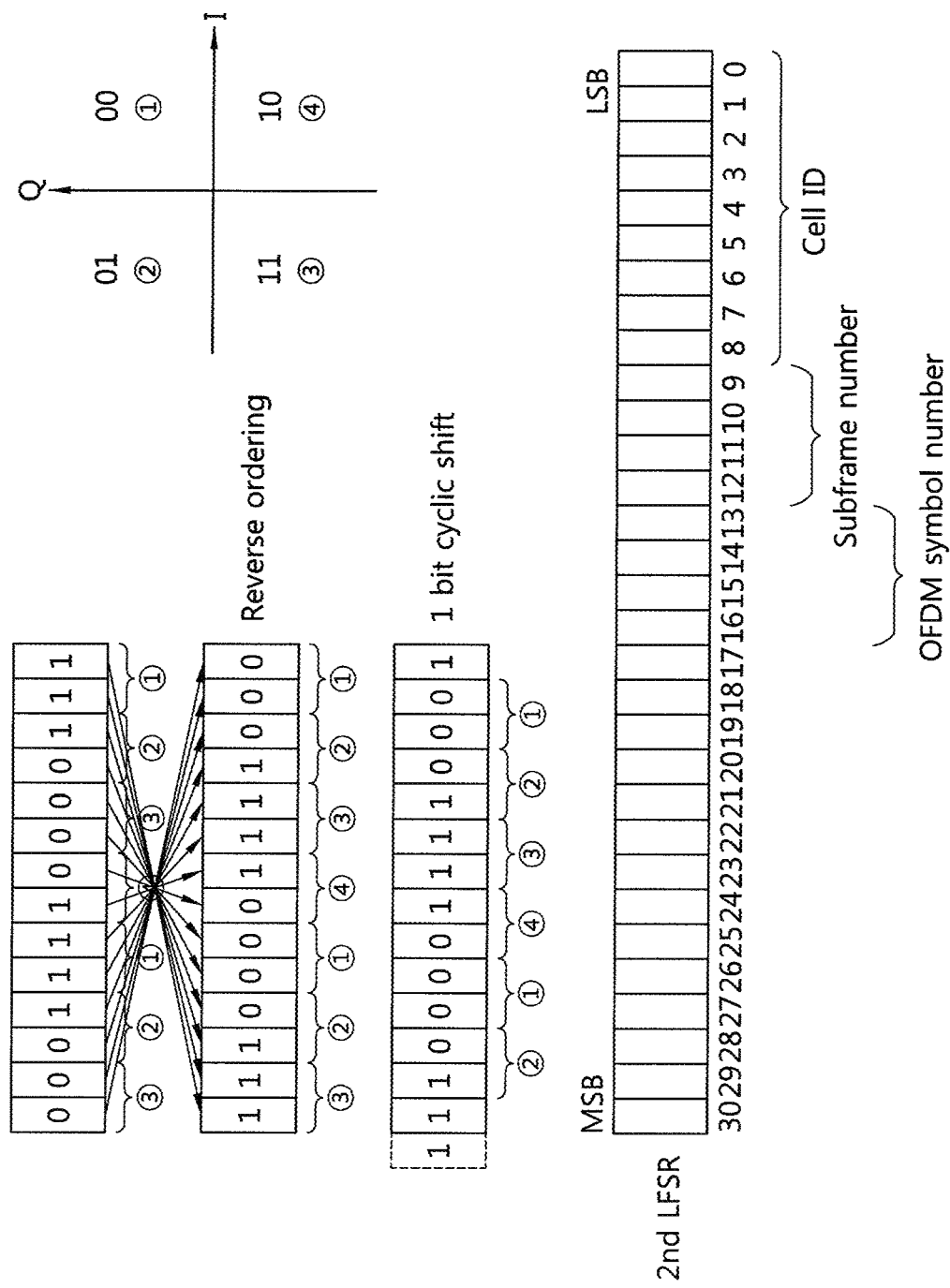
FIG. 12 shows an example where bit sequences, which are cyclically mapped in QPSK modulation, are set to initial values.

FIG. 12 shows an example where bit sequences, which are cyclically mapped in QPSK modulation, are set to initial values. Assume that bit sequences '00', '01', '11', and '10' on the QPSK constellation respectively correspond to modulation symbols ①, ②, ③, and ④. The bit sequences are set so that 4 modulation symbols uniformly appear in 14 bits from an MSB. First, a first bit sequence '00011110000111' is defined so that the modulation symbols appear in an order of ①, ②, ③, ④, ①, ②, ③. In practice, an output of the gold sequence generator starts from an LSB. Thus, a second bit sequence '11100001111000' is defined by inversion of the first bit sequence. 17 bits from the LSB are set to values given according to a cell ID, a subframe number, and an OFDM symbol number, and one QPSK modulation symbol consists of 2 bits. Thus, a third sequence '11000011110001' is generated by cyclic-shifting the second bit sequence leftward by 1 bit. Among the 14 bits from the MSB, a bit nearest to the 17 bits from the LSB are randomly set, and bits subsequent to the nearest bit (i.e., a $19^{th}$ bit from the LSB) are mapped to one modulation symbol in a unit of 2 bits. Consequently, if a modulation symbol is output starting from the LSB, in case of the third sequence, the modulation symbol is output in an order of ①, ②, ③, ④, ①, ②.

Table 4 shows the PAPR property according to the number of RBs when the 14 bits of the MSB are set to '11000011110001'.

TABLE 4

| # of RB | MSB | LSB | Peak value | PAPR |
|---|---|---|---|---|
| 6 | 11000011110001 | 10110000010110111 | 0.96 | 1.71 |
| 12 | 11000011110001 | 01100100010101001 | 1.31 | 2.33 |
| 25 | 11000011110001 | 01110101011011011 | 1.42 | 2.42 |
| 50 | 11000011110001 | 01111001101100100 | 1.70 | 2.90 |
| 100 | 11000011110001 | 00110000011001010 | 2.06 | 3.52 |

As shown in Table 4, the PAPR property is improved when the 14 bits from the MSB are set to proposed values.

In another embodiment, various combinations of the 14 bits from the MSB are proposed to improve the PAPR property. The 14 bits from the MSB can be changed from '00000000000000' to '11111111111111' in order to find a value having an optimal PAPR property for all possible cases, which results in significantly large complexity. It is assumed herein that the number of RBs is 6, 12, 25, 50, or 100, and a reference signal in use is a sequence having a length corresponding to the number of RBs. For each number of RBs, 17 bits from the LSB are differently set according to a cell ID, a subframe number, and an OFDM symbol number. The reference signal is subjected to an IFFT operation for OFDM modulation, and if a peak value of an OFDM symbol that is a time-domain signal exceeds a specific threshold, the OFDM symbol is removed from candidates.

Table 5 shows 14 bits from the MSB having a best PAPR property for each number of RBs (i.e., 6, 12, 25, 50, and 100).

TABLE 5

| # of RB | MSB | LSB | Peak value | PAPR |
|---|---|---|---|---|
| 6 | 00010001110001 | 00000001110000010 | 0.89 | 1.58 |
| 12 | 11001100100000 | 01000110110110101 | 1.10 | 1.96 |
| 25 | 01011111100110 | 00000011011100011 | 1.28 | 2.19 |
| 50 | 01100110010101 | 00010110100100101 | 1.42 | 2.42 |
| 100 | 00100001000101 | 01100100011010000 | 1.44 | 2.46 |

When an optimal value shown in Table 5 is used in the 14 bits from the MSB according to each number of RBs, increase of a PAPR caused by bias can be prevented.

Table 6 shows a peak value and a PAPR when the 14 bits from the MSB (i.e., '00010001110001') of Table 5 are used for each number of RBs. It shows that, when an optimal value for a specific number of RBs is used for a different number of RBs, the optimal value may not be optimal.

TABLE 6

| # of RB | MSB | LSB | Peak value | PAPR |
|---|---|---|---|---|
| 6 | 00010001110001 | 00000001110000010 | 0.89 | 1.58 |
| 12 | 00010001110001 | 01000011010101011 | 1.50 | 2.67 |
| 25 | 00010001110001 | 01000000010110001 | 1.51 | 2.58 |
| 50 | 00010001110001 | 10110011000011001 | 1.68 | 2.86 |
| 100 | 00010001110001 | 00010100111100111 | 1.75 | 2.99 |

To be selected as the optimal value, it is important to have uniform PAPR characteristics over multiple RBs. When the optimal value is set to a value which has the smallest sum of the peak values for each RB among values not to exceeds a specific threshold, the 14 bits from the MSB, '00111101101100', is selected as the optimal value. Table 7 shows a peak value and a PAPR when the 14 bits from the MSB, '00111101101100' of Table 7 are used for each number of RBs.

TABLE 7

| # of RB | MSB | LSB | Peak value | PAPR |
|---|---|---|---|---|
| 6 | 00111101101100 | 01100011010011001 | 0.89 | 1.59 |
| 12 | 00111101101100 | 00001000101010101 | 1.14 | 2.03 |
| 25 | 00111101101100 | 00000111111001000 | 1.40 | 2.40 |
| 50 | 00111101101100 | 01001001010101000 | 1.55 | 2.65 |
| 100 | 00111101101100 | 10010011111001000 | 1.56 | 2.66 |

The PAPR property deteriorates in comparison with the result of Table 5, which can be regarded as an optimum, but the PAPR property shows a better result than the result of Table 6 in which the 14 bits from the MSB (i.e., '00010001110001') are used. Thus, the peak value and the PAPR property are uniform as a whole. Accordingly, complexity can be lower than a case of using the 14 bits from the MSB differently according to the number of RBs, and has an advantage in that a memory size is reduced.

A method of improving the PAPR property by setting the initial values of the second LFSR of the gold sequence generator has been described above. Hereinafter, a method of improving the PAPR property of a sequence by setting the initial values of the first LFSR will be described.

In one embodiment, the initial value of the first LFSR can be defined to specific values. For example, bit sequences to which modulation symbols can be uniformly mapped on a QPSK constellation are set to the initial values. If bit sequences '00', '01', '11', and '10' are reversely sorted (this is because an LSB is first output in the gold sequence) and mapping is repeated only up to 31 bits, a resultant value is '1111000011110000111100001111000'. Table 8 shows a peak value and a PAPR according to the number of RBs and initial values of the first LFSR when the initial values of the first LFSR is '1111000011110000111100001111000'. The PAPR is significantly decreased in comparison with the result of Table 2.

TABLE 8

| # of RB | MSB | LSB | Peak value | PAPR |
|---|---|---|---|---|
| 6 | 00000000000000 | 00000111110010000 | 0.95 | 1.69 |
| 12 | 00000000000000 | 01110010110011100 | 1.16 | 2.07 |
| 25 | 00000000000000 | 01110001110001110 | 1.77 | 3.02 |
| 50 | 00000000000000 | 01100010011001001 | 1.86 | 3.18 |
| 100 | 00000000000000 | 10010111111011000 | 1.74 | 2.97 |

Figure 13:
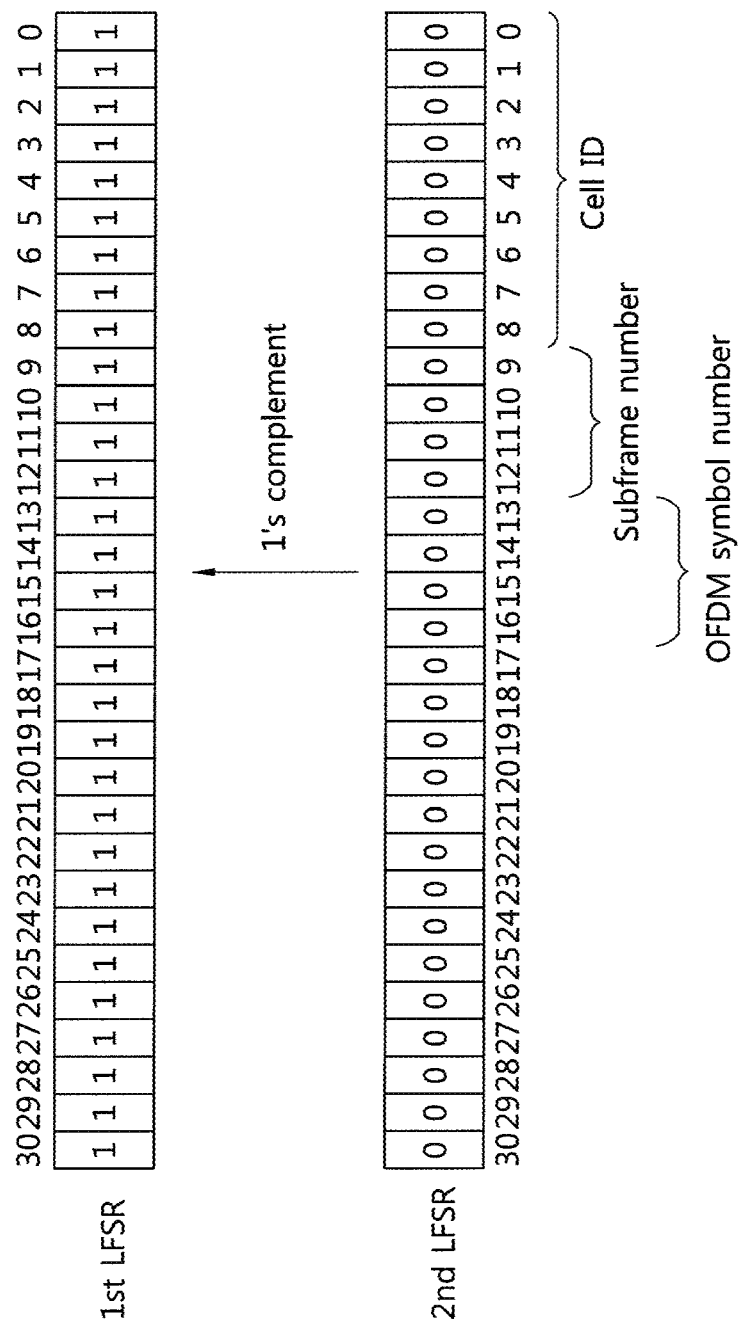
FIG. 13 shows an example where the initial values of the first LFSR are set to 1's complements of the initial values of the second LFSR.

In another embodiment, the initial values of the first LFSR can be set to 1's complements of the initial values of the second LFSR. FIG. 13 shows an example where the initial values of the first LFSR are set to 1's complements of the initial values of the second LFSR. Even if the initial values of the second LFSR of the gold sequence generator are set to '0', the initial values of the first LFSR are all set to 1's complements of the initial values of the second LFSR. Accordingly, a sequence having a more random property can be generated, and thus deterioration of the PAPR property can be prevented. Table 9 shows a result when the initial values of the first LFSR are set to 1's complements of the initial values of the second LFSR.

TABLE 9

| # of RB | MSB | LSB | Peak value | PAPR |
|---|---|---|---|---|
| 6 | 00000000000000 | 00000000000001000 | 0.97 | 1.72 |
| 12 | 00000000000000 | 00010001010101010 | 1.27 | 2.26 |
| 25 | 00000000000000 | 00010101010101010 | 2.22 | 3.78 |
| 50 | 00000000000000 | 01110001110001110 | 2.98 | 5.08 |
| 100 | 00000000000000 | 00010100100000110 | 3.91 | 6.68 |

Meanwhile, to distinguish a reference signal between cells or between UEs, the reference signal has to have a good correlation property. As described with reference to FIG. 11, in the initial values of the gold sequence generator, if only a cell ID differs and other values (i.e., a subframe number and an OFDM symbol number) are identical, a generated pseudo-random sequence may equally overlap in some periods. This occurs because only values of 9 bits of the initial values are different among 31 bits of the initial values. This problem may be solved by considering a fact that only a portion of a sequence generated as a reference signal is used. This is because, even if a pseudo-random sequence having a length of $M_{max}$ (this sequence is referred to as a basic sequence) is generated, a sequence having a length of M (this sequence is referred to as a used sequence) is used according to the number of RBs. Thus, if the used sequence is selected at different offsets from basic sequences generated according to the cell ID, it is possible to solve a problem in that the sequence overlaps in a portion of period due to almost identical initial values.

Now, a method of setting an offset of a sequence according to a cell ID will be described.

It is assumed that a basic sequence having a length of Mmax, i.e., a basic sequence $c(i)$ ($i=0, 1, \ldots, M_{max}-1$), is generated by the gold sequence generator, and then a used sequence having a length of M is used. In this case, $M \leq M_{max}$. An offset of the used sequence, i.e., a start point of the used sequence, is set differently according to the cell ID.

Figure 14:
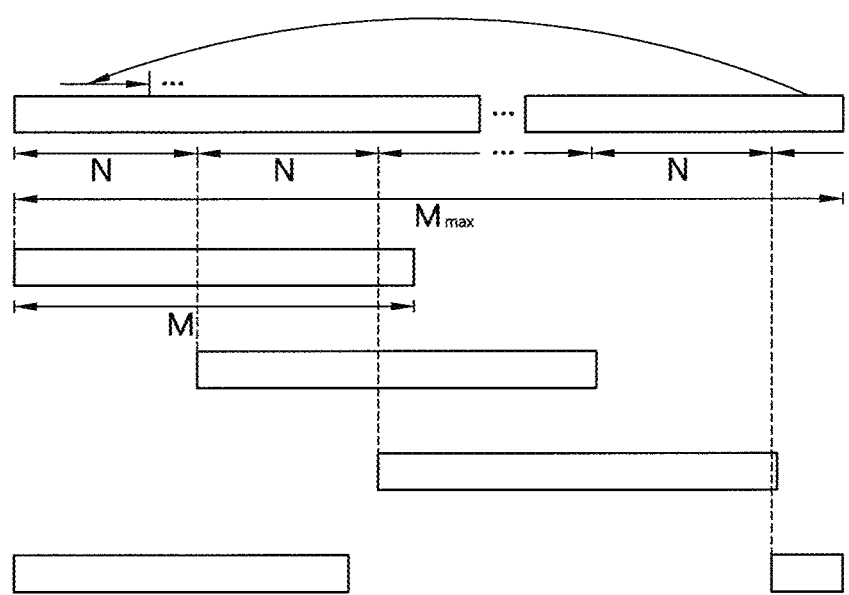
FIG. 14 shows that an offset of an available sequence varies according to a cell ID.

FIG. 14 shows that an offset of an available sequence varies according to a cell ID. Herein, an offset is placed with a spacing of N in a basic sequence having a length of $M_{max}$ according to the cell ID, and a used sequence having a length of M is selected. The used sequence is cyclic shifted when exceeding a range of the basic sequence. From the basic sequence $c(i)$ ($i=0, 1, \ldots, M_{max}-1$), a used sequence $cu(i)$ ($i=0, 1, \ldots, M-1$) can be expressed as shown:

$$cu(i) = c((i + N \cdot N_{ID}^{cell}) \bmod (M_{max}-1)) \qquad \text{[Equation 2]}$$

where 'mod' is a modulo operation, N is an offset interval, and $N_{ID}^{cell}$ is a cell ID. Although the same offset is defined for each cell ID herein, this is for exemplary purposes only, and thus the offset may be defined differently for each cell ID.

By varying a start point of the used sequence according to the cell ID, the used sequence may vary even if initial values are similar. Therefore, a random property can be guaranteed, and the PAPR property can be prevented from deterioration.

Equation 2 above can be expressed in a format of a reference signal for the 3GPP LTE system in which resources are allocated in an RB unit, which is shown in the following equation.

$$r_{l,n_s}(m) = \frac{1}{\sqrt{2}}(1 - 2 \cdot c(2m)) + j\frac{1}{\sqrt{2}}(1 - 2 \cdot c(2m+1)), \qquad \text{[Equation 3]}$$

$$m = 0, 1, \ldots, 2N_{RB}^{max,DL} - 1$$

$$a_{k,l}^{(p)} = r_{l,n_s}(m')$$

$$m = 0, 1, \ldots, 2 \cdot N_{RB}^{DL} - 1$$

$$m' = (m + N_{Interval}^{RS} N_{ID}^{cell}) \bmod (2 \cdot N_{RB}^{max,DL} - 1)$$

Herein, $n_s$ is a slot number within a radio frame, l is an OFDM symbol number within a slot, $r_{l,n_s}$ is a reference signal sequence, $N_{RB}^{max,DL}$ is a maximum number of RBs, m is an index of the reference signal sequence, m' is an index for taking a portion of the reference signal sequence, $N_{RB}^{DL}$ is the number of RBs in use, $a_{k,l}(p)$ is modulation symbols used as a reference symbol for a p-th antenna port at a slot $n_s$, k is a subcarrier index used for transmission of a reference signal, and $N_{RS}^{interval}$ is an interval of a start point based on a cell ID $N_{cell}^{ID}$. $r_{l,n_s}(m)$ may be a basic sequence, and $r_{l,n_s}(m')$ may be a used sequence.

Figure 15:
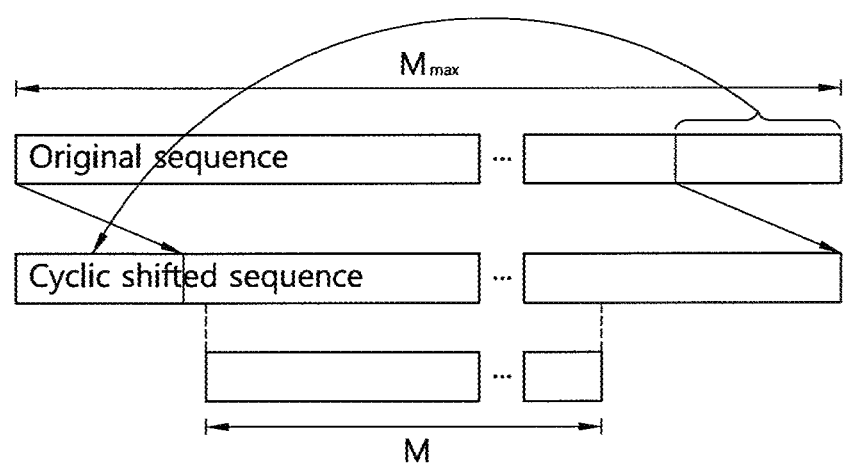
FIG. 15 shows that a basic sequence in use is cyclic shifted according to a cell ID.

FIG. 15 shows that a basic sequence in use is cyclic shifted according to a cell ID. A basic sequence having a length of $M_{max}$ (i.e., a basic sequence c(i) (i=0, 1, . . . , $M_{max}$−1)) is generated by the gold sequence generator. Thereafter, a cyclic shift amount N is determined according to the cell ID. Then, the basic sequence is cyclic shifted by the cyclic shift amount N. In this case, a start point of the used sequence may always be placed at the same position. From the basic sequence c(i) (i=0, 1, . . . , $M_{max}$−1), an used sequence cu(i) (i=0, 1, . . . , M−1) can be expressed by the following equation:

$$c_{shift}((i+N\cdot N_{ID}^{cell}) \bmod (M_{max}-1))=c(i)$$

$$cu(i)=c_{shift}(i) \quad \text{[Equation 4]}$$

where $c_{shift}(i)$ is a sequence obtained by cyclic shifting the basic sequence by the cyclic shift amount N.

Equation 4 above can be expressed in a format of a reference signal for the 3GPP LTE system in which resources are allocated in an RB unit, which is shown in the following equation.

$$r_{l,n_s}(m) = \frac{1}{\sqrt{2}}(1-2\cdot c(2m)) + j\frac{1}{\sqrt{2}}(1-2\cdot c(2m+1)),$$

$$m = 0, 1, \ldots, 2N_{RB}^{max,DL}-1$$

$$a_{k,l}^{(p)} = r_{l,n_s}(m')$$

$$m = 0, 1, \ldots, 2\cdot N_{RB}^{DL}-1$$

$$m' = (m + N_{Interval}^{RS} N_{ID}^{cell} + N_{RB}^{max,DL} - N_{RB}^{DL}) \bmod (2\cdot N_{RB}^{max,DL}-1)$$
[Equation 5]

In another embodiment, when a pseudo-random sequence is generated by the gold sequence generator, some sequences generated initially can be excluded. A sequence having a length of Nc may be removed from an initially generated gold sequence, and a subsequence sequence may be used as a reference signal sequence. Initial values have a great effect on the initially generated sequences, and thus PAPR property deterioration caused by similar initial values can be avoided. This can be expressed by the following equation.

$$c'(i)=c(i+Nc) \quad \text{[Equation 6]}$$

Equation 6 above can be expressed in a form of Equation 1 above, which is shown in the following equation.

$$c(i)=(x(i+Nc)+y(i+Nc)) \bmod 2$$

$$x(i+31)=(x(i+3)+x(i)) \bmod 2$$

$$y(i+31)=(y(i+3)+y(i+2)+y(i+1)+y(i)) \bmod 2 \quad \text{[Equation 7]}$$

A value Nc may be set to a length which is generated sufficiently randomly so that a generated pseudo-random sequence is not affected by initial values. For example, the value Nc may range from 1500 to 1800.

Equation 7 above can be expressed in a format of a reference signal for the 3GPP LTE system in which resources are allocated in an RB unit by using the pseudo-random sequence c(i), which is shown in the following equation.

$$r_{l,n_s}(m) = \frac{1}{\sqrt{2}}(1-2\cdot c(2m)) + j\frac{1}{\sqrt{2}}(1-2\cdot c(2m+1)), \quad \text{[Equation 8]}$$

-continued $$m = 0, 1, \ldots, 2N_{RB}^{max,DL}-1$$

$$a_{k,l}^{(p)} = r_{l,n_s}(m')$$

$$m = 0, 1, \ldots, 2\cdot N_{RB}^{DL}-1$$

$$m' = m + N_{RB}^{max,DL} - N_{RB}^{DL}$$

Now, the cross-correlation property between generated pseudo-random sequences is described.

A pseudo-random sequence G(D) generated using two m-sequences X(D) and Y(D) is expressed by the following polynomial form.

$$G(D)=c_0+c_1 D+c_2 D^2+\ldots$$

$$G(D)=X(D)\oplus Y(D) \quad \text{[Equation 9]}$$

Herein, a first m-sequence X(D) is $I_1(D)/g_1(D)$, and a second m-sequence Y(D) is $I_2(D)/g_2(D)$. $g_1(D)$ and $g_2(D)$ are primitive polynomials for generating X(D) and Y(D), and are defined as follows.

$$g_1(D)=1+D^{-3}+D^{-31}$$

$$g_2(D)=1+D^{-1}+D^{-2}+D^{-3}+D^{-31} \quad \text{[Equation 10]}$$

$I_1(D)$ and $I_2(D)$ are initial values for generating X(D) and Y(D), and are defined by the following equation.

$$I_1(D)=1$$

$$I_2(D)=I(\text{CELLID})\oplus I(N_{sf})D^9 \quad \text{[Equation 11]}$$

Herein, I(CELLID) is an initial value according to a cell ID CELLID, and $I(N_{sf})D^9$ is an initial value according to a slot number and an OFDM symbol number.

In a synchronous environment where timing is identical between multiple cells, neighboring cells have the same slot number and the same OFDM symbol number. If it is assumed that the same slot number and the same OFDM symbol number are used, a cross-correlation between pseudo-random sequences generated in two neighboring cells having different cell IDs CELLID1 and CELLID2 is obtained by the following equation.

$$\begin{aligned} G_1(D)\oplus G_2(D) &= X(D)\oplus Y_1(D)\oplus X(D)\oplus Y_2(D) \\ &= Y_1(D)\oplus Y_2(D) \\ &= I_{2,cell1}(D)/g(D)\oplus I_{2,cell2}(D)/g(D) \\ &= [I(\text{CELLID1})\oplus I(N_{sf})D^9]/g(D)\oplus \\ &\quad [I(\text{CELLID2})\oplus I(N_{sf})D^9]/g(D) \\ &= I(\text{CELLID1})/g(D)\oplus I(N_{sf})D^9/g(D)\oplus \\ &\quad I(\text{CELLID2})/g(D)\oplus I(N_{sf})D^9/g(D) \\ &= I(\text{CELLID1})/g(D)\oplus I(\text{CELLID2})/g(D) \end{aligned}$$
[Equation 12]

The above equation shows that the cross-correlation property is determined only by the cell ID. Since there is no change in the cross-correlation property between cells according to changes in the slot number and the OFDM symbol number, it may be difficult to obtain a sequence having a good cross-correlation property in this method.

When modulated sequences consisting of modulation symbols obtained by performing QPSK modulation on generated pseudo-random sequences are denoted as R1[n] and R2[n] for two cells, respectively, the modulated sequences can be expressed by the following equation:

$$R1[n]=S[2n]X1[2n]+jS[2n+1]X1[2n+1]$$
$$R2[n]=S[2n]X2[2n]+jS[2n+1]X2[2n+1] \quad \text{[Equation 13]}$$

where S[n] is a cell common sequence depending on a subframe number and an OFDM symbol number, and X1[n] and X2[n] are cell specific sequences obtained from each cell ID. A cross-correlation for the above sequences R1[n] and R2[n] can be obtained by the following equation:

$$R1[n]R2[n]^* = (S[2n]X1[2n] + jS[2n+1]X1[2n+1]) \quad \text{[Equation 14]}$$
$$(S[2n]X2[2n] + jS[2n+1]X2[2n+1])^* =$$
$$X1[2n]X2[2n]^* + X1[2n+1]X2[2n+1]^* +$$
$$j(S[2n+1]X1[2n+1]S[2n]^*X2[2n]^* -$$
$$S[2n+1]X2[2n+1]S[2n]^*X1[2n]^*)$$

where ( )* denotes a complex conjugate. A cross-correlation result of the two modulated sequences R1[n] and R2[n] shows that a cell common sequence component that varies by a subframe number and an OFDM symbol number exists without alteration in a Q-axis whereas the cell common sequence component is removed in an I-axis. Therefore, it is difficult to obtain a good cross-correlation property between cells.

Accordingly, a method is proposed to improve the cross-correlation property between generated pseudo-random sequences.

Figure 16:
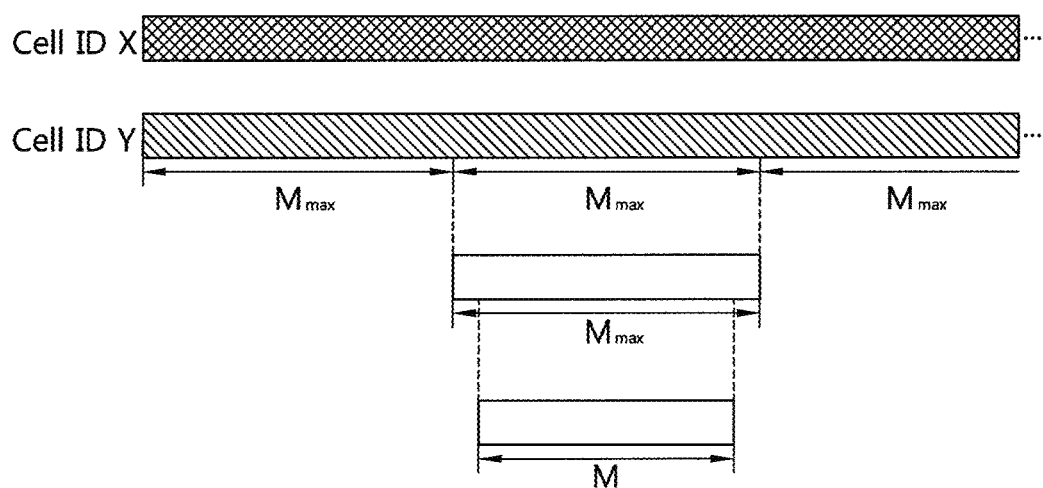
FIG. 16 shows that the start point of the used sequence is changed according to the subframe number and/or the OFDM symbol number.

In one embodiment, a start point of a used sequence can be changed according to a subframe number and/or an OFDM symbol number. FIG. 16 shows that the start point of the used sequence is changed according to the subframe number and/or the OFDM symbol number. A long pseudo-random sequence is generated according to each cell ID. A plurality of basic sequences, each having a length of $M_{max}$, capable of supporting a maximum number of RBs are obtained from the long pseudo-random sequence according to the subframe number and the OFDM symbol number. A used sequence having a length of M, which is used for transmission of an actual reference signal, is obtained from a basic sequence. Accordingly, the cross-correlation property of a reference signal between cells can be improved.

The reference sequence can be expressed in a format of a reference signal for the 3GPP LTE system in which resources are allocated in an RB unit, which is shown in the following equation:

$$r_{l,n_s}(m) = \quad \text{[Equation 15]}$$
$$\frac{1}{\sqrt{2}}(1 - 2 \cdot c(2m + l')) + j\frac{1}{\sqrt{2}}(1 - 2 \cdot c(2m + 1 + l')),$$
$$l' = 4N_{RB}^{max,DL} \cdot (N_{symb}^{DL} \cdot n_s + l) \text{ and}$$
$$m = 0, 1, \ldots, 2N_{RB}^{max,DL} - 1$$

where $n_s$ is a slot number within a radio frame, l is an OFDM symbol number within a slot, $r_{l,n_s}$ is a reference signal sequence, $N_{RB}^{max,DL}$ is a maximum number of RBs, m is an index of the reference signal sequence, and $N_{symb}^{DL}$ is the number of OFDM symbols included in a slot. A basic sequence c(i) generated by the gold sequence generator is initialized with $N_{ID}^{cell}+1$ at the start of each OFDM symbol.

In another embodiment, initial values used in generation of a basic sequence can be changed to improve the cross-correlation property. If a subframe number and/or an OFDM symbol number are identical in a synchronous environment where timing is identical between multiple cells, the initial values depending on the subframe number and/or the OFDM symbol number are similar between cells, which may result in a poor correlation property. In addition, in an asynchronous environment, a transmit time difference between neighboring cells needs to be taken into consideration so that the initial values are not contiguously identical.

The initial values may vary differently according to changes in the subframe number and/or the OFDM symbol number between cells. For example, a first cell may be configured so that an initial value is increased or decreased as the number of OFDM symbol number is increased, and a second cell may also be configured so that an initial value is increased or decreased as the OFDM symbol number is increased. For example, a cell having a cell ID of CELLID1 is configured so that an initial value is increased by n as the OFDM symbol number is increased by 1. In addition, a cell having a cell ID of CELLID2 is configured so that an initial value is increased by n+1 as the OFDM symbol number is increased by 1.

The OFDM symbol number may be extended in a radio frame unit instead of existing within a subframe or a slot, so that changes of initialization are different as the OFDM symbol number varies. If $N_{sym}$ OFDM symbols exist for each subframe, a q-th OFDM symbol number of a k-th subframe of a radio frame can be expressed by $k*N_{sym}+q$.

In a system in which the number of OFDM symbols included in each subframe varies, a maximum number $N_{sym,max}$ of OFDM symbols for each subframe can be defined. In this case, the $q^{th}$ OFDM symbol number of the $k^{th}$ subframe of the radio frame can be expressed by $k*N_{sym,max}+q$. The reason above is to allow each OFDM symbol to have a unique OFDM symbol number in one radio frame.

The gold sequence generator may increase or decrease an initial value of an m-sequence by a predetermined interval as the OFDM symbol number is increased. For example, a cell having a cell ID of CELLID1 is allowed to increase an initial value by a predetermined value such as CELLID1 or CELLID1+1 as the OFDM symbol number is increased by 1. In addition, a cell having a cell ID of CELLID2 is allowed to increase an initial value by a predetermined value such as CELLID2 or CELLID2+1 as the OFDM symbol number is increased by 1. However, this may be problematic when a cell ID between cells has a difference of about two times. For example, if CELLID1=5, CELLID2=11 and the predetermined values are CELLID1+1 and CELLID2+1 respectively, then initial values increased as the OFDM symbol number is increased are respectively 6 and 12, which shows a difference of two times. This can be expressed in a binary format in which one bit is shifted. This is because 6 is '0110' in a binary format, and 12 is '1100' in a binary format. When one bit is shifted, the cross-correlation property deteriorates in case of using QPSK modulation due to overlapping between an I-axis component of a reference signal of a first cell and a Q-axis component of a reference signal of a second cell.

Therefore, as the OFDM symbol number and/or the subframe number are increased, there is a need to set the initial values such that an increment of one cell is not two times an increment of another cell. This can be easily implemented by allowing the initial value to be increased or decreased in odd multiples as the OFDM symbol number and/or the subframe number are increased. For example, an initial value of the gold sequence generator having a cell ID of n is allowed to be increased or decreased by (2n+1) times as the OFDM symbol number is increased or decreased.

This can be expressed in a format of a reference signal for the 3GPP LTE system in which resources are allocated in an RB unit, which is shown in the following equation.

$$r_{l,n_s}(m) = \frac{1}{\sqrt{2}}(1 - 2 \cdot c(2m)) + j\frac{1}{\sqrt{2}}(1 - 2 \cdot c(2m+1)),$$ [Equation 16]

$$m = 0, 1, \ldots, 2N_{RB}^{max,DL} - 1$$

Herein, $n_s$ is a slot number within a radio frame, l is an OFDM symbol number within a slot, $r_{l,ns}$ is a reference signal sequence, and $N_{RB}^{max,DL}$ is a maximum number of RBs. In this case, the sequence generator can be initialized by the following equation:

$$c_{init}=2^9 \cdot (l'+1) \cdot (2 \cdot N_{ID}^{cell}+1)+N_{ID}^{cell}$$ [Equation 17]

where l' is defined as $8n_s+l$ and is an OFDM symbol number within a radio frame.

Meanwhile, a cross-correlation between pseudo-random sequences depends on a binary addition result of initial values used to generate two pseudo-random sequences, which is shown in the following equation.

$$G_1(D) \oplus G_2(D) = X(D) \oplus Y_1(D) \oplus X(D) \oplus Y_2(D)$$

$$= Y_1(D) \oplus Y_2(D)$$

$$= I_{2,cell1}(D)/g(D) \oplus I_{2,cell2}(D)/g(D)$$

$$= (I_{2,cell1}(D) \oplus I_{2,cell2}(D))/g(D)$$

Therefore, if the pseudo-random sequences are generated by varying the initial values according to each OFDM symbol number, a good cross-correlation property is obtained when the binary addition result of the initial values of the respective cells varies as the OFDM symbol number varies. This implies that an initial value $c_{init}(n_1, l)$ of a first cell and an initial value $c_{init}(n_2, l)$ of a second cell vary as the OFDM symbol number l varies. Herein, $n_1$ is a cell ID of the first cell, and $n_2$ is a cell ID of the second cell. In addition, in consideration of QPSK modulation, the good cross-correlation property can be obtained when $(2 \cdot c_{init}(n_1,l)) \oplus c_{init}(n_2,l)$ and $c_{init}(n_1,l) \oplus (2 \cdot c_{init}(n_2,l))$ vary according to the OFDM symbol number l.

Figure 17:
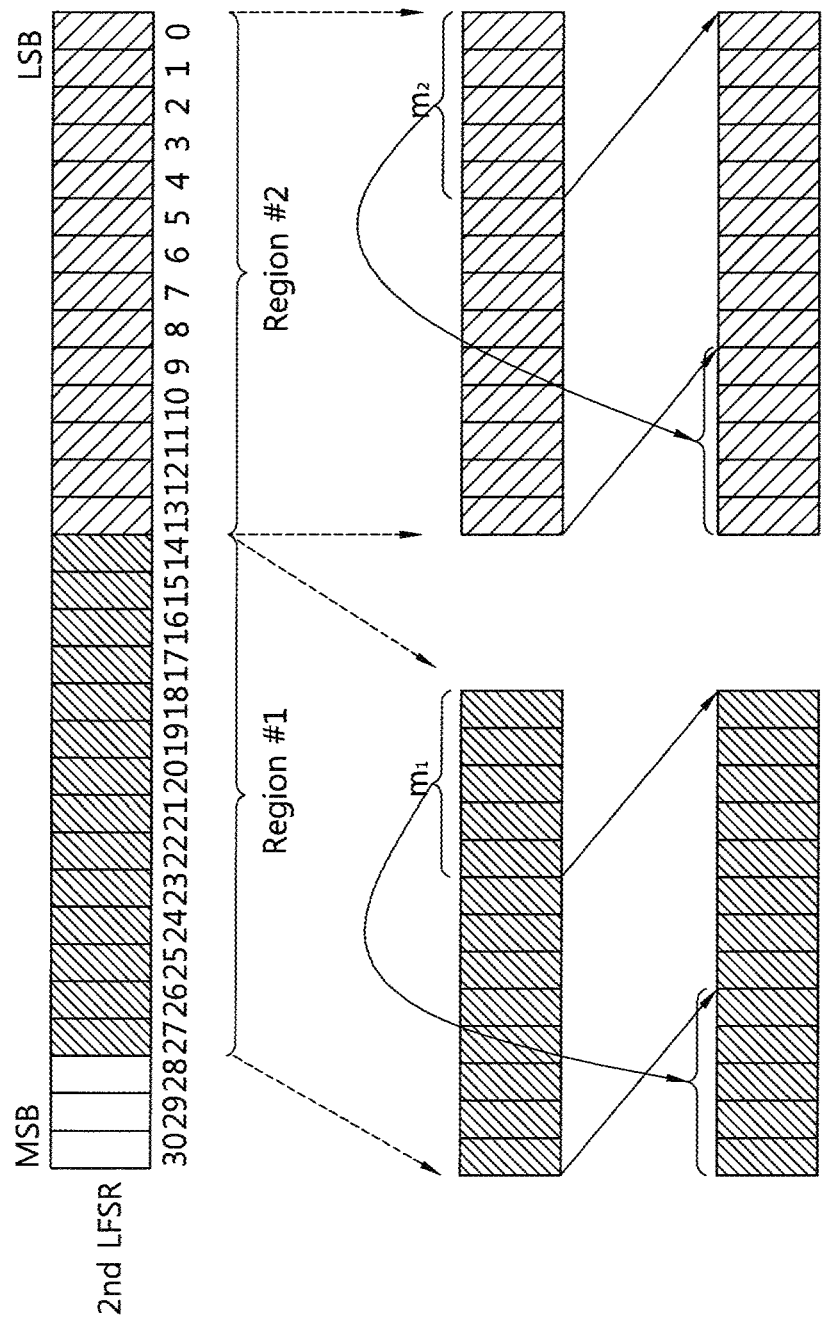
FIG. 17 shows setting of initial values of a gold sequence generator.

FIG. 17 shows setting of initial values of a gold sequence generator. 31 bits of initial values of the second LFSR are divided into two regions (i.e., a region #1 and a region #2). Each region consists of 14 bits. The region #2 is positioned in an LSB side. Any value can be set to the remaining 4 bits from an MSB. Each of the region #1 and the region #2 includes a binary sequence of a cell ID. In the region #1, the binary sequence of the cell ID is cyclic shifted by a first cyclic shift $m_1$ according to the OFDM symbol number l. In the region #2, the binary sequence of the cell ID is cyclic shifted by a second cyclic shift $m_2$ according to the OFDM symbol number l. For example, in the region #1, the binary sequence of the cell ID can be cyclic shifted by a cyclic shift $lm_1$, and in the region #2, the binary sequence of the cell ID can be cyclic shifted by a cyclic shift $lm_2$. By dividing the initial values into two regions and by including a binary sequence of a cell ID for which a different cyclic shift is used for in each region, $c_{init}(n_1,l) \oplus c_{init}(n_2,l)$ is allowed to be changed according to the OFDM symbol number l.

If $b_1$ denotes a size of the region #1 and $b_2$ denotes a size of the region #2, then $b_1=b_2=14$. The sizes of the regions #1 and #2 can be arbitrarily defined within a range of the initial value. To increase a generation period of a gold sequence, $b_1$ and $b_2$ may be set to be relatively prime. In addition, $m_1$ and $b_1$ as well as $m_2$ and $b_2$ may also be set to be relatively prime.

This can be expressed in a format of a reference signal for the 3GPP LTE system in which resources are allocated in an RB unit, which is shown in the following equation:

$$r_{l,n_s}(m) = \frac{1}{\sqrt{2}}(1 - 2 \cdot c(2m)) + j\frac{1}{\sqrt{2}}(1 - 2 \cdot c(2m+1)),$$ [Equation 19]

$$m = 0, 1, \ldots, 2N_{RB}^{max,DL} - 1$$

where $c_{init}2^{14} \cdot CS_{13}(2N_{ID}^{cell}+1, 11 \cdot l')+CS_{14}(2N_{ID}^{cell}+1, 3 \cdot l')$ at the start of each OFDM symbol, $l'=2 \cdot n_s+\lfloor(2 \cdot 1)/N_{symb}^{DL}\rfloor$, and $CS_b(M,a)=(2^{amodb} \cdot M) \bmod 2^b + \lfloor(2^{amodb} \cdot M)/2^b\rfloor$. l' is an OFDM symbol number within a radio frame, $CS_b(M, a)$ is a cyclic shift function, and $\lfloor x \rfloor$ denotes a floor function which give a largest integer smaller than x.

Although it has been described that the proposed sequence is used for a downlink reference signal of the 3GPP LTE/LTE-A, the proposed sequence can also be used for an uplink reference signal. In addition, although PAPR and cross-correlation properties have been described for a reference signal between cells, these properties can also be equally used for a reference signal between UEs and/or between antennas.

A reference signal used for the proposed sequence may be either a cell common reference signal or a UE specific reference signal.

Figure 18:
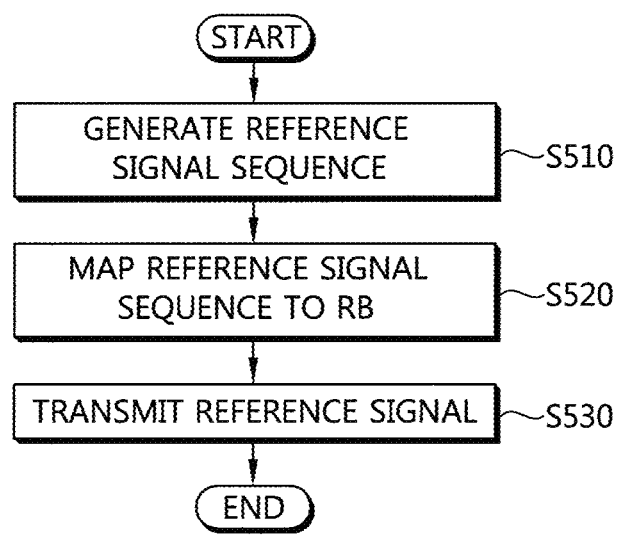
FIG. 18 is a flowchart showing a method of transmitting a reference signal according to an embodiment of the present invention.

FIG. 18 is a flowchart showing a method of transmitting a reference signal according to an embodiment of the present invention. This method may be performed by a transmitter. The transmitter may a part of a BS when a downlink reference signal is transmitted, or may a part of a UE when an uplink reference signal is transmitted. In step S510, a reference signal sequence is generated. The reference signal sequence can be defined by the following equation.

$$r_{l,n_s}(m) = \frac{1}{\sqrt{2}}(1 - 2 \cdot c(2m)) + j\frac{1}{\sqrt{2}}(1 - 2 \cdot c(2m+1)),$$ [Equation 20]

$$m = 0, 1, \ldots, 2N_{RB}^{max,DL} - 1$$

Herein, $n_s$ is a slot number within a radio frame, l is an OFDM symbol number within a slot, $r_{l,ns}$ is a reference signal sequence, and $N_{RB}^{max,DL}$ is a maximum number of RBs. The pseudo-random sequence c(i) can be defined by Equation 7 above. Herein, the m-sequence x(i) can be initialized with initial values expressed by x(0)=1, x(i)=0, i=1, 2, . . . , 30, and the m-sequence (y) can be initialized with initial values obtained from $(2N_{ID}^{cell}+1)$, where $N_{ID}^{cell}$ is a cell ID. The initial values of the m-sequence y(i) varies as the OFDM symbol number l varies. Therefore, the initial values of the m-sequence y(i) can be obtained from $l(2N_{ID}^{cell}+1)$.

In step S520, a portion or entirety of the reference signal sequence is mapped to at least one RB. One RB can include 12 subcarriers. In case of a cell common reference signal, two modulation symbols of the reference sequence can be mapped to two subcarriers within one RB. In case of a UE specific reference signal, three modulation symbols of the reference signal sequence can be mapped to three subcarriers within one RB.

In step S530, the reference signal is transmitted using the RB. A proposed reference signal sequence provides improved PAPR and cross-correlation properties. Therefore, transmit power efficiency of a transmitter can be increased, and a receiver can be provided with higher detection performance.

Figure 19:
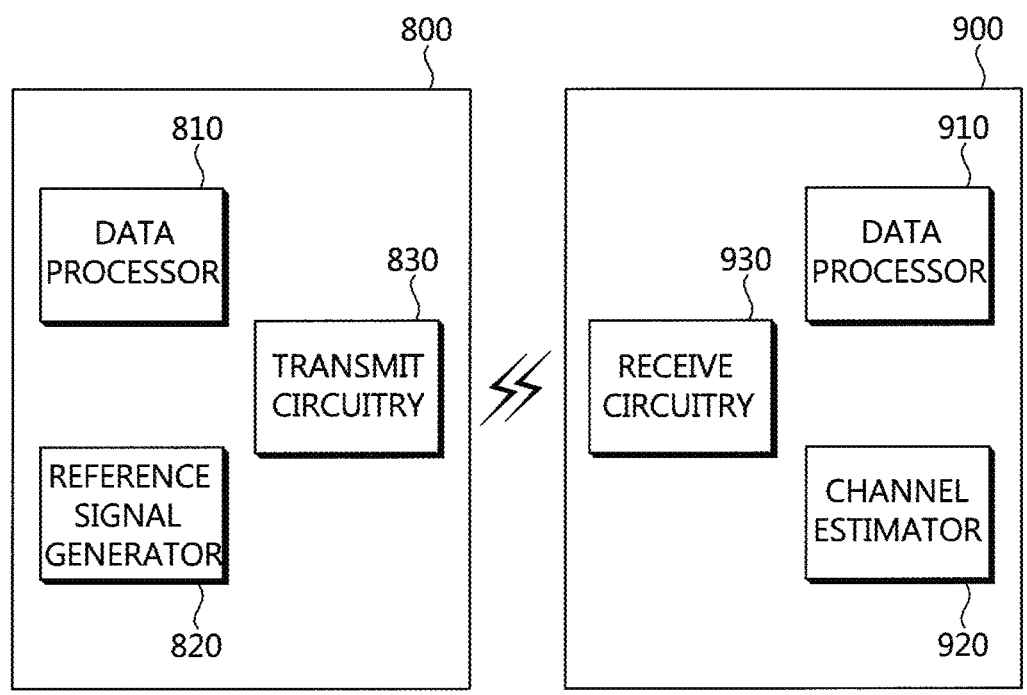
FIG. 19 is a block diagram showing a transmitter and a receiver implementing for a method of transmitting and receiving a reference signal.

FIG. 19 is a block diagram showing a transmitter and a receiver implementing for a method of transmitting and receiving a reference signal. A transmitter 800 includes a data processor 810, a reference signal generator 820, and a transmit circuitry 830. The data processor 810 processes an information bit to generate a transmit signal. The reference signal generator 820 generates a reference signal. The reference signal generation of FIG. 18 may be performed by the reference signal generator 820. The transmit circuitry 830 transmits the transmit signal and/or the reference signal.

A receiver 910 includes a data processor 910, a channel estimator 920, and a receive circuitry 930. The receive circuitry 930 receives a reference signal and a receive signal. The channel estimator 920 estimates a channel by using the received reference signal. The data processor 910 processes the receive signal by using the estimated channel.

Although a proposed sequence is used for a reference signal as an example in the aforementioned embodiment, the proposed sequence can be used for various signals. For example, the proposed sequence can be used for a scrambling code, a synchronous signal, a preamble, a masking code, etc. Based on the pseudo-random sequence c(i) of Equation 7, a base sequence of Equation 20 may be generated. The m-sequence y(i) for the pseudo-random sequence c(i) may be initialized with initial values obtained from $(2N_{ID}^{cell}+1)$, where $N_{ID}^{cell}$ is a cell ID. The base sequence may be applied with a target signal or a target code. To apply the base sequence with the target signal or the target code, a portion or entirety of the reference signal sequence may be used according to allocated resources or the length (or size) of the target signal or the target code. Applied sequence is transmitted. The transmitted sequence may be used as various applications by a receiver.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method performed by a transmitting device, the method comprising:
generating a reference signal sequence; and
transmitting the reference signal sequence to a receiver,
wherein the reference signal sequence is defined by $$r(m) = \frac{1}{\sqrt{2}}(1 - 2 \cdot c(2m)) + j\frac{1}{\sqrt{2}}(1 - 2 \cdot c(2m+1))$$

where m=0, . . . , M, M is an integer larger than zero, and c(2m) and c(2m+1) are defined by a pseudo-random sequence c(i), and
wherein the pseudo-random sequence c(i) is defined by a gold sequence generator which is initialized with an initial value obtained by using $(2N_{ID}^{cell})$, where $N_{ID}^{cell}$ is a cell identifier.

2. The method of claim 1, wherein the pseudo-random sequence c(i) is defined by $c(i)=(x(i+Nc)+y(i+Nc))\mod 2$ $x(i+31)=(x(i+3)+x(i))\mod 2$ $y(i+31)=(y(i+3)+y(i+2)+y(i+1)+y(i))\mod 2$ where x(i) and y(i) are m-sequences and Nc is a constant.

3. The method of claim 1, wherein the initial value is obtained by using $(2N_{ID}^{cell}+1)$ and an orthogonal frequency division multiplexing (OFDM) symbol number.

4. The method of claim 1, further comprising:
mapping the reference signal sequence to at least one resource block (RB) before transmitting the reference signal sequence.

5. The method of claim 4, wherein a value relates to the number of the at least one RB.

6. A device comprising:
a reference signal generator configured to generate a reference signal sequence; and
a transmit circuitry configured to transmit the reference signal sequence to a receiver,
wherein the reference signal sequence is defined by $$r(m) = \frac{1}{\sqrt{2}}(1 - 2 \cdot c(2m)) + j\frac{1}{\sqrt{2}}(1 - 2 \cdot c(2m+1))$$

where m=0, . . . , M, M is an integer larger than zero, and c(2m) and c(2m+1) are defined by a pseudo-random sequence c(i), and
wherein the pseudo-random sequence c(i) is defined by a gold sequence generator which is initialized with an initial value obtained by using $(2N_{ID}^{cell}+1)$, where $N_{ID}^{cell}$ is a cell identifier.

7. The device of claim 6, wherein the pseudo-random sequence c(i) is defined by $c(i)=(x(i+Nc)+y(i+Nc))\mod 2$ $x(i+31)=(x(i+3)+x(i))\mod 2$ $y(i+31)=(y(i+3)+y(i+2)+y(i+1)+y(i))\mod 2$ where x(i) and y(i) are m-sequences and Nc is a constant.

8. The device of claim 6, wherein the initial value is obtained by using $(2N_{ID}^{cell}+1)$ and an orthogonal frequency division multiplexing (OFDM) symbol number.

9. The device of claim 6, wherein the transmit circuitry is configured to map the reference signal sequence to at least one resource block (RB) before transmitting the reference signal sequence.

10. The device of claim 9, wherein a value of M relates to the number of the at least one RB.

* * * * *

UNITED STATES PATENT AND TRADEMARK OFFICE
CERTIFICATE OF CORRECTION

PATENT NO.         : 10,673,667 B2                                    Page 1 of 1
APPLICATION NO.    : 16/023910
DATED              : June 2, 2020
INVENTOR(S)        : Lee et al.

It is certified that error appears in the above-identified patent and that said Letters Patent is hereby corrected as shown below:

In the Claims

Claim 1, Column 20, Line 21:

Please change "by using $(2 N_{ID}^{cell})$,"

To -- by using $(2 N_{ID}^{cell} + 1)$, --

Signed and Sealed this
Thirtieth Day of August, 2022

Katherine Kelly Vidal
*Director of the United States Patent and Trademark Office*